(12) United States Patent
Von Fange

(10) Patent No.: US 11,686,443 B1
(45) Date of Patent: *Jun. 27, 2023

(54) ELECTRICAL CONNECTOR STRIP ADAPTED FOR STRUCTURAL APPLICATIONS

(71) Applicant: The Light Source, Inc., Charlotte, NC (US)

(72) Inventor: Eric E. Von Fange, Charlotte, NC (US)

(73) Assignee: The Light Source. Inc., Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/087,029

(22) Filed: Dec. 22, 2022

Related U.S. Application Data

(63) Continuation of application No. 17/876,675, filed on Jul. 29, 2022, now Pat. No. 11,555,590, which is a continuation of application No. 17/208,530, filed on Mar. 22, 2021, now Pat. No. 11,402,074, which is a continuation of application No. 16/255,186, filed on Jan. 23, 2019, now Pat. No. 10,955,096.

(60) Provisional application No. 62/620,610, filed on Jan. 23, 2018.

(51) Int. Cl.
| | |
|---|---|
| F21S 8/06 | (2006.01) |
| F21V 21/088 | (2006.01) |
| F21V 21/116 | (2006.01) |
| F21V 21/008 | (2006.01) |
| F16M 13/02 | (2006.01) |

(52) U.S. Cl.
CPC ........... *F21S 8/063* (2013.01); *F16M 13/022* (2013.01); *F21V 21/008* (2013.01); *F21V 21/0885* (2013.01); *F21V 21/116* (2013.01)

(58) Field of Classification Search
CPC ...... F21S 8/063; F16M 13/022; F21V 21/008; F21V 21/0885; F21V 21/116
See application file for complete search history.

(56) References Cited

U.S. PATENT DOCUMENTS

| | | | | |
|---|---|---|---|---|
| 5,012,043 A | * | 4/1991 | Seymour | H02G 3/18 324/133 |
| 5,704,801 A | * | 1/1998 | Walker | H01R 12/675 439/417 |
| 5,756,972 A | * | 5/1998 | Vranicar | H02G 15/105 439/459 |
| D453,671 S | * | 2/2002 | Von Fange | D8/72 |
| 7,243,870 B2 | * | 7/2007 | Pook | F21V 21/38 242/278 |

(Continued)

*Primary Examiner* — Abdullah A Riyami
*Assistant Examiner* — Nader J Alhawamdeh
(74) *Attorney, Agent, or Firm* — Schwartz Law Firm, P.C.

(57) ABSTRACT

An electrical connector strip is adapted for structural applications in theater, television and entertainment industries. The connector strip includes an elongated rigid enclosure defining a hollow continuous internal wireway receiving electrical wiring within an interior of the enclosure. At least one outlet pocket is formed in a side wall of the enclosure. A connector adapter plate is located in the outlet pocket and extends within the interior of the enclosure. At least one output connector is carried by the connector adapter plate, and resides within the interior of the enclosure with external access provided through the outlet pocket.

13 Claims, 22 Drawing Sheets

(56) References Cited

U.S. PATENT DOCUMENTS

| | | | | |
|---|---|---|---|---|
| 7,628,428 | B2* | 12/2009 | Rampton | F16L 59/106 |
| | | | | 285/80 |
| 8,344,655 | B2* | 1/2013 | Luk | H05B 47/18 |
| | | | | 315/294 |
| 8,680,394 | B2* | 3/2014 | Korcz | H02G 3/20 |
| | | | | 174/67 |
| 9,701,559 | B2* | 7/2017 | Töngi | C03B 9/3618 |
| 2009/0052122 | A1* | 2/2009 | Johnson | H02G 3/00 |
| | | | | 361/643 |
| 2010/0218969 | A1* | 9/2010 | Purves | H05K 5/0008 |
| | | | | 174/59 |
| 2019/0203878 | A1* | 7/2019 | Deng | F16M 11/041 |
| 2019/0309897 | A1* | 10/2019 | Ehlis Pirretas | B60R 11/0241 |
| 2020/0063949 | A1* | 2/2020 | Worman | F21V 23/0421 |
| 2020/0132281 | A1* | 4/2020 | Huang | F21V 21/002 |

* cited by examiner

ELECTRICAL CONNECTOR STRIP ADAPTED FOR STRUCTURAL APPLICATIONS

TECHNICAL FIELD AND BACKGROUND OF THE DISCLOSURE

The present disclosure relates broadly and generally to an electrical connector strip (or "pipe") adapted for structural applications, particularly in theater, television and entertainment industries.

In the theater, television and entertainment industries it is common to hang or support portable lighting fixtures (luminaires) above and around the stage. The standard method used for overhead lighting is simply to hang or support the luminaires from a horizontal pipe using a special pipe or C-Clamp. The standard pipe used for stage lighting applications in North America is known as Schedule 40 (and Schedule 80) pipe. This pipe is rated for structural applications, and is generally used exclusively for lighting applications. The pipe is available in both Schedule 40 (standard wall) and Schedule 80 (extra heavy wall), from a wide number of plumbing and steel suppliers in the USA and Canada. It is usually supplied in 20 or 22' lengths. This pipe is easily cut and threaded on-site if required to accommodate a wide range of standard plumbing fittings (couples, T's L's and end caps.)

For general theater, television and entertainment lighting applications, 1.5 inch Schedule 40 steel pipe is used almost exclusively. Schedule 80 pipe is often used where additional strength is required. The outside diameter of both 1.5" SC 40 and SC 80 pipes is 1.90 inches. This pipe is most often used in the construction of overhead lighting grids and is also used as the 'fly pipe' in most counterweight or winch type of systems. This pipe is also used in the construction of vertical lighting booms, lighting towers and lighting ladders.

The standard lighting pipe clamp (C-Clamp) that is used to hang most lighting fixtures is ideally sized and suited for 1.5 inch, SC 40 or 80 pipes. The typical force required to tighten the clamp (by hand) cannot damage the pipe. Some other standard lighting accessories also use the same C-Clamp, including the side arm and the scenery bumper. Although both 1.25" and 2.0" pipe will work with most American and British C-Clamps, only 1.50" pipe (with a 1.90 inch outside diameter) is recommended for professional lighting applications (no exceptions). For most lighting applications, steel 1.5" SC 40 pipe is supported on not less than 9-10 foot mounting centers. Due to a thicker wall, SC 80 pipe is stronger, heavier and more expensive than SC 40 (standard) pipe.

Typically steel pipe should be specified as being 'rust free' and with a 'clear lacquer protective finish'. It should also be specified that the pipe must be straight and true. This pipe can also be painted (after a complete cleaning and priming).

Although steel SC 40 and SC 80 pipe is used for most lighting applications, this pipe is also available in aluminum with the exact same inside and outside dimensions. Aluminum pipe is more expensive than steel and is usually used only for lightweight or touring applications (such as portable lighting trusses, booms or towers) Aluminum pipe may also be more easily damaged than steel pipe, particularly by an over tightened pipe clamp. Aluminum lighting pipes should not be painted as the paint tends to chip and flake off after prolonged use. The natural aluminum finish is 'self-protecting' and provides some reflective 'glitter', suitable for many entertainment lighting applications. Aluminum SC 40 pipe is often used as the luminaire mounting pipe in the manufacture of aluminum lighting trusses.

SC 40 and SC 80 pipe is often used for structural applications and can easily be welded. In addition to the standard 'threaded' plumbing fittings that are available, a number of different companies also make non threaded accessories (flanges, fittings, hangers and connectors) for many different pipe diameters. (KEE-KLAMP Company, USA, is one example). Structural applications particularly where life safety is concerned should be approved or certified by a registered structural engineer.

Connector Strips have been traditionally constructed of fabricated sheet metal or of aluminum extrusions comprising an enclosure body and enclosure cover. This two-part construction facilitated wire splicing of the internal power connections of the external power cords or flush outlets. As data usage became more prevalent in the entertainment industry, connector strips have added data outlets along with the power outlets. These data outlets have traditionally been located in separate compartments to comply with electrical codes for separation of different classes/voltages of wiring.

In the greatest majority of the previous connector strip designs, an assembly was made of the connector strip body with lid and one or two structural pipe(s), typically one pipe below the connector strip, and sometimes one above and below the connector strip. The purpose of the connector strip is to distribute electrical power and the purpose of the pipe(s) is to support lighting fixtures as well as other items such as scenery, curtains, speakers, and etc. . . . . . The entire connector strip assembly is joined together with brackets and suspended with a variety of methods from the building structure. Often pipes are used without the connector strips to provide additional unpowered locations for curtains, scenery, lighting fixtures and accessories and to reduce the total installed cost. In exemplary embodiments, the invention of the present disclosure (referred to herein as "Power Data Pipe" or "PDP") does away with the need for a separate connector strip and simply uses the pipe body as the electrical enclosure to contain all of the electrical power and data circuits. The PDP does not require permanent wiring to the building. PDP pipe sections that are utilized for curtain and scenery pipes will distribute electrical power and data over the entire pipe when needed by simply plugging in the PDP to a flexible power drop.

The PDP does away with the need for the traditional Connector Strip enclosure by enclosing all of the wiring in the suspended pipe itself. Previously the power and the data wiring have been run in separate compartments. However, there is an exception to this separation rule in the UL 1573 Stage Studio standard in UL 1573 28 Separation of Circuits 28.1 "Conductors of two circuits involving different voltages, such as between a limited-voltage/current circuit and a line voltage circuit, shall be separated from each other by a barrier or segregated as specified in 28.2 unless the conductors of both circuits are insulated for the maximum voltage of either circuit." Using this section of the standard, if the lower voltage (data in this case) wiring is provided with the same voltage insulation as the highest voltage wiring required in the enclosure, and the data is related to the power circuits, then both may co-exist in the same enclosure. The PDP utilizes this format of using the same high voltage insulation for both power and data wiring, with the Data wiring controlling the devices attached to the power wiring, to run both the power and data wiring in the same enclosure. The requirement for separation of Data wiring from the power wiring is overcome by utilizing Data wires with the same voltage insulation as the requirement for the power wiring.

SUMMARY OF EXEMPLARY EMBODIMENTS

Various exemplary embodiments of the present disclosure are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the invention or to imply that certain features are critical, essential, or even important to the structure or function of the invention. Rather, these terms are merely intended to highlight alternative or additional features that may or may not be utilized in a particular embodiment of the present invention.

In one exemplary embodiment, the disclosure comprises an electrical connector pipe adapted for structural applications in theater, television and entertainment industries. The connector pipe includes a rigid tubular enclosure defining a hollow continuous internal wireway receiving electrical wiring within an inside diameter of the enclosure, and having a substantially uniform outside diameter between opposite ends of the enclosure. The enclosure may be fabricated of a metal, such as aluminum (etched and powder coated) or steel, or a molded polymeric material/composite. One exemplary embodiment comprises a 1½ inch Schedule 80 aluminum pipe enclosure. At least one outlet pocket is formed in a side wall of the enclosure. A connector adapter plate is located in the outlet pocket, and extends within the inside diameter of the enclosure. At least one output connector is carried by the connector adapter plate, and resides within the inside diameter of the enclosure with external access provided through the outlet pocket.

In alternative embodiments, the at least one output connector resides inside the enclosure and is retained (e.g., frictionally) without the use of a connector plate or other hardware. For example, a beveled milled pocket in the enclosure wall and a matching beveled single piece connector body that includes both power and data outlets does not require an adapter plate.

According to another exemplary embodiment, no portion of the output connector extends through the outlet pocket beyond the outside diameter of the enclosure.

According to another exemplary embodiment, the output connector is a female power receptacle.

According to another exemplary embodiment, the output connector is a multi-pin (male or female) XLR data connector.

According to another exemplary embodiment, the output connector comprises both a female power receptacle and a data connector.

According to another exemplary embodiment, the enclosure comprises first and second recessed fastener shelves formed at opposite ends of the outlet pocket. The connector adapter plate has first and second mounting tabs which reside directly adjacent respective fastener shelves.

According to another exemplary embodiment, each mounting tab of the connector adapter plate defines a countersunk fastener hole receiving a threaded fastener through the adjacent fastener shelf of the enclosure, such that the threaded fastener secures the connector adapter plate within the inside diameter of the enclosure.

According to another exemplary embodiment, the connector adapter plate further comprises a plate body defining a cutout receiving the output connector and locating the output connector within the inside diameter of the enclosure.

According to another exemplary embodiment, the connector adapter plate further comprises first and second spacer tabs interconnecting the first and second mounting tabs and the plate body.

According to another exemplary embodiment, a power feed adapter is located a feed end of the enclosure.

According to another exemplary embodiment, an internal splice sleeve is located within the enclosure and is adapted for mechanically interconnecting the electrical connector pipe to a second electrical connector pipe. Multiple internal splice sleeves may be utilized to interconnect multiple electrical connector pipes in a linear series of any desired length.

According to another exemplary embodiment, an end cap is located at a terminal end of the enclosure.

According to another exemplary embodiment, an electrical feed box is located at a feed end of the enclosure.

According to another exemplary embodiment, a feed box adapter sleeve operatively interconnects the electrical feed box and the feed end of the enclosure.

According to another exemplary embodiment, the enclosure comprises a plurality of outlet pockets formed in the side wall of the enclosure, a corresponding plurality of connector adapter plates located in the outlet pockets, and a plurality of output connectors carried by the connector adapter plates within the inside diameter of the enclosure.

According to another exemplary embodiment, the enclosure comprises a single-wall homogenous tubular structure integrally formed between opposite ends of the enclosure.

According to another exemplary embodiment, the enclosure is fabricated of a metal selected from a group consisting of steel and aluminum.

In another exemplary embodiment, the present disclosure comprises an overhead lighting grid adapted for structural applications in theater, television and entertainment industries. The exemplary lighting grid incorporates an assembly of electrical connector pipes, such as described herein.

In yet another exemplary embodiment, the present disclosure comprises a method for constructing an overhead lighting grid adapted for structural applications in theater, television and entertainment industries. The method includes assembling a plurality of electrical connector pipes, such as described herein, and then operatively interconnecting the connector pipes together in an overhead lighting grid.

Entire disclosure of prior U.S. Pat. No. 8,344,655 B2 is incorporated by reference herein.

NUMBERED PARTS ILLUSTRATED IN THE DRAWINGS

1 PDP enclosure 96" in length
2 PDP enclosure 48" in length
3 PDP enclosure 32" in length
4 PDP enclosure 16" in length 5 Sliding internal splice sleeve
6 End Cap
7 Feed box adapter sleeve
8 Connector adapter plate
9 Panel mount Edison connector
10 Flush 90 degree PCB mount 5 pin XLR female receptacle
11 Flush 90 degree PCB mount 5 pin XLR female receptacle with terminator resistor
12 Flush 90 degree PCB mount 5 pin XLR Male connector
13 6-32 tpi by 0.25" long flat head Phillips screw
14 ½"–13 tpi by ⅜" long socket set screw
15 ¾" Romex cable clamp
16 ¼-20 tpi by ¾" long socket cap screw
17 Plastite screw 0.29 mm×8 mm long
18 Data input Male 5 pin XLR PCB
19 Data output Female 5 pin XLR PCB
20 RS-485 Data Cable
21 Data foil Shield
22 Data Braid Shield
23 Heat shrink tubing
24 Soldered data joint
25 Termination Resistor 120 ohm
26 IDC connection for Edison connector (9)
27 Cap for IDC connection for Edison connector (9)
28 Snap lock tabs for Panel mount Edison connector (9)
29 PCB wire connection hole for soldering Data Cable
30 PCB terminator resistor
31 Data +
32 Data −
33 Drain wire/common
34 Connector adapter plate (8) offset bend
35 Connector adapter plate (8) countersink screw hole
36 PDP enclosure (57) Milled pocket (36)
37 PDP enclosure (57) Milled ledge (37) to support connector adapter plate (8)
38 PDP enclosure (57) connector adapter plate (8) screw pocket
39 PDP enclosure (57) connector adapter plate (8) screw threaded 6-32 tpi hole
40 PDP enclosure (57) ½"-13 tpi threaded hole for structural and ground connection
41 PDP enclosure (57) milled slot (41) for splice actuation
42 Feed adapter threaded hole for ground connection
43 Feed Box enclosure assembly
44 Feed Box adapter shoulder
45 Feed box adapter 1" NPT male thread extension
46 Feed box 1" conduit nut
47 Feed Box Enclosure
48 Feed box knockouts
49 Feed box ground screw
50 Feed box Terminal strip
51 Feed box enclosure cover
52 Feed box fasteners
53 Feed box wiring identification labels
54 "Soccapex" 19 Pin Male connector
55 "Soccapex" to PDP enclosure (57) adapter
56 12 gauge XLPE 125-degree C. wire conductor
57 PDP enclosure body
58 Machined pocket for set screw connection
59 Wireway through adapter or splice
60 Mounting surface for 19 pin connector
61 Mounting screw threaded holes for 19 pin connector
62 Mega-Clamp for connecting a theatrical luminaire
63 Feed Conduit adapter body
64 Connector plate mounting screw tab
65 internally threaded adapter sleeve
66 Mega-Folding Batten Clamp UL 1573 Definitions:

3.12 CONNECTOR STRIP—A wireway mounted on rigging (a network of lines and chains used for support and manipulation of scenery and equipment) or to the building structure above or adjacent to the luminaires it supplies. Receptacles or drop cords are provided for the connection of spotlights, floodlights, and portable striplights that are capable of being mounted to or suspended from the strip. A connector strip with many portable striplights is equivalent to a borderlight.

3.13 CORD CONNECTOR—A connector device for a flexible cord to which an attachment plug is connected.

3.20 ENCLOSURE—A material provided to enclose electrical parts and components that present a risk of fire. When determined to comply with applicable additional requirements, all or part of the enclosure is capable of also serving as an accessibility barrier, dripping material barrier, or lamp containment barrier.

3.36 NON-STANDARD RECEPTACLE, CORD CONNECTOR, and PLUG—A receptacle, cord connector, or plug that has a slot or blade or pin configuration that has not been assigned a voltage or current rating by a nationally-recognized, standards-developing organization or by the general practice of an industry. Stage-type fittings are categorized as non-standard.

3.43 RECEPTACLE—A connector device permanently connected to the supply circuit to which an attachment plug is connected.

3.49 STANDARD RECEPTACLE, CORD CONNECTOR, or PLUG—A receptacle, cord connector, or plug that has a slot or blade or pin configuration assigned a voltage and current rating by a nationally recognized, standards-developing organization or by the general practice of an industry. Examples of standard fittings as defined in this paragraph and used in this standard are:

a) Fittings with a slot, blade, pin, or sleeve configuration as specified in the Standard for Wiring Device Configurations, UL 1681, and other configurations specified in the National Electrical Manufacturers Association (NEMA) publications for wiring devices and b) Fittings with a pin or sleeve configuration as specified in the Standard for Pin and Sleeve Configurations, UL 1686, or the Standard for Plugs, Receptacles, and Cable Connectors of the Pin and Sleeve Type, UL 1682.

28 Separation of Circuits 28.1 Conductors of two circuits involving different voltages, such as between a limited-voltage/current circuit and a line voltage circuit, shall be separated from each other by a barrier or segregated as specified in 28.2 unless the conductors of both circuits are insulated for the maximum voltage of either circuit. Exception: A 15-ampere receptacle or cord connector supplied by a circuit that is protected by branch-circuit overcurrent protection rated 20 amperes is not required to be provided with additional overcurrent protection.

BRIEF DESCRIPTION OF THE DRAWINGS

Exemplary embodiments of the present disclosure will hereinafter be described in conjunction with the following drawing figures, wherein like numerals denote like elements, and wherein.

DESCRIPTION OF EXEMPLARY EMBODIMENTS AND BEST MODE

The present invention is described more fully hereinafter with reference to the accompanying drawings, in which one or more exemplary embodiments of the invention are shown. This invention may, however, be embodied in many different forms and should not be construed as limited to the embodiments set forth herein; rather, these embodiments are provided so that this disclosure will be operative, enabling, and complete.

Accordingly, the particular arrangements disclosed are meant to be illustrative only and not limiting as to the scope of the invention, and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
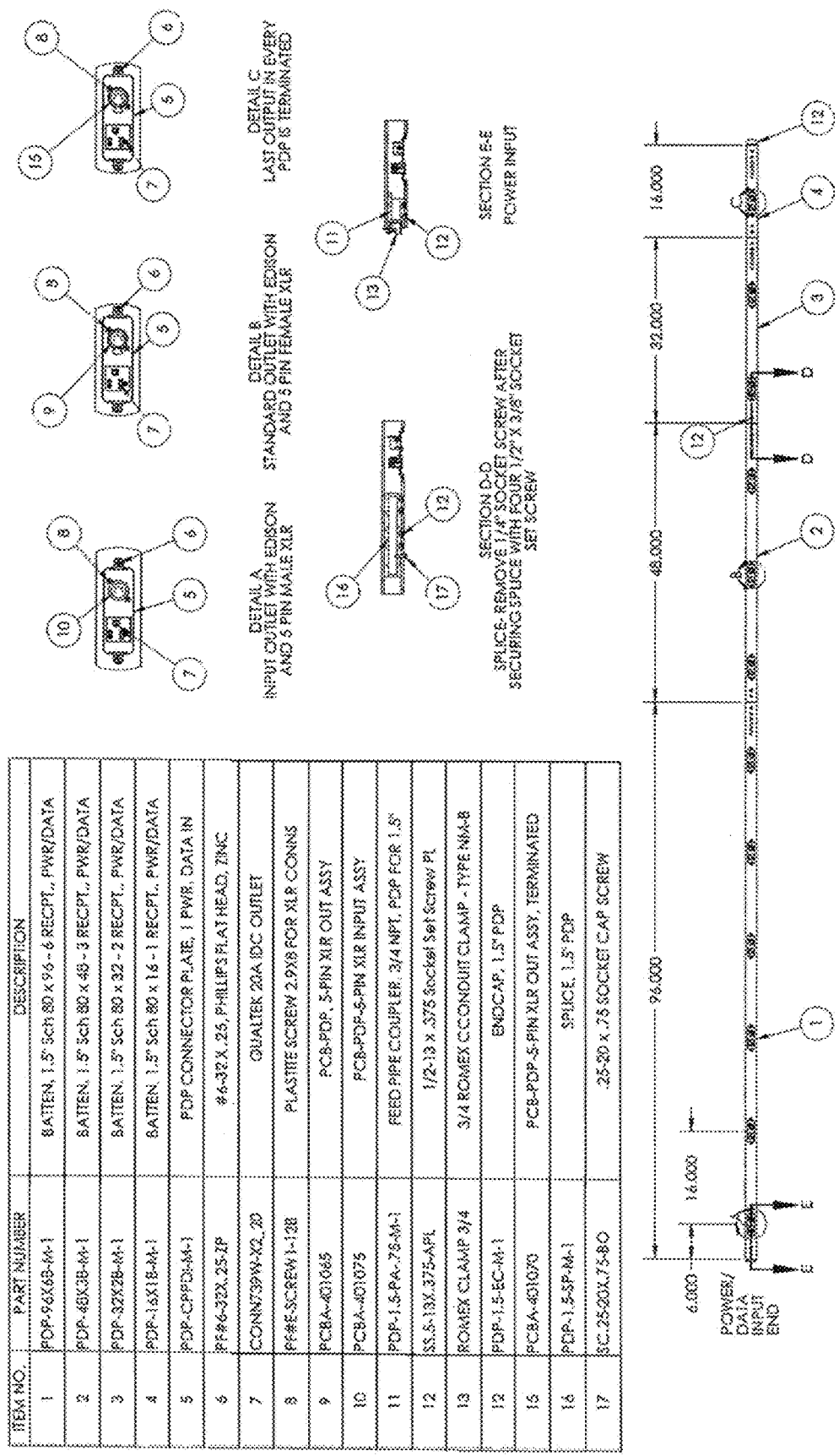
FIG. 1 is a view of the present electrical wiring connector pipe according to one exemplary embodiment of the disclosure.

Referring now specifically to the drawings, an electrical wiring connector pipe according to one exemplary embodiment of the present disclosure is illustrated in FIG. 1 and shown generally at broad reference numeral 10. The connector pipe incorporates a number of spaced, electrical outlets including power and/or data connectors in a structural metal tubular enclosure. In exemplary embodiments described further below, the present connector pipe comprises both power and data output connectors (e.g., outlets or receptacles), and is especially adapted for structural applications and electrical connections in the theater, television and entertainment industries. Although referred to throughout as "Power Data Pipe" (or PDP), the concept of the present disclosure is equally applicable to a connector pipe comprising power only or data only.

Overview of Exemplary "Power Data Pipe" (PDP)

Figure 8:
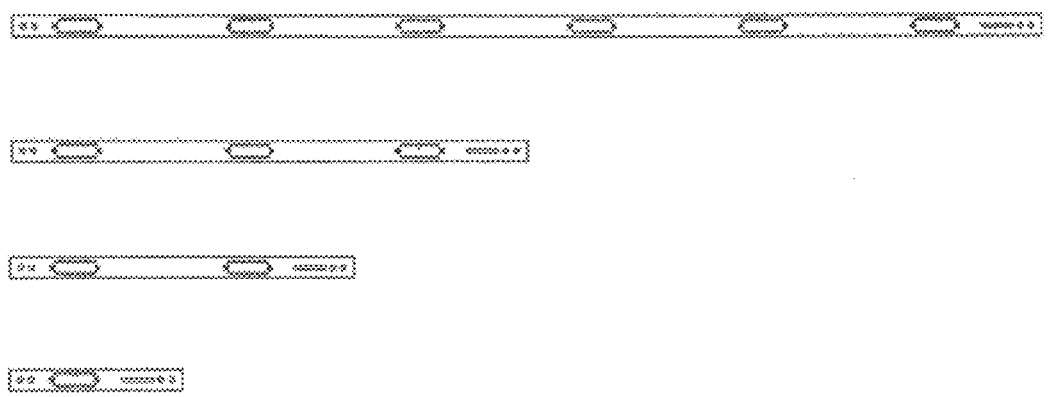
FIG. 8 illustrates various sections/lengths of the exemplary connector pipe.

The present PDP may have a generally modular construction formed in a variety of different lengths including, for example: (a) a 96-inch length enclosure with six longitudinally spaced pairs of output connectors, (b) a 48-inch length enclosure with three longitudinally spaced pairs of output connectors, (c) a 32-inch length enclosure with two longitudinally spaced pairs of output connectors, and (d) a 16-inch length enclosure with a single pair of output connectors. See FIG. 8. Each connector pair has both a female power receptacle and a male or female data connector. The modular PDPs are readily assembled together using sliding internal splice sleeves, described further below, to extend a total length of the exemplary PDP assembly up to 100 feet. As indicated previously, a power-only receptacle may be substituted for any output pair in applications that do not require data. A power feed adapter (described further below) is located at a feed end of the PDP assembly, while the terminal end of the PDP assembly is closed with a rounded end cap. The power feed adapter, sliding internal splice sleeve and end cap may be secured to the PDP enclosure using suitable hardware, such as ½"-13 tpix⅜" socket set screws.

Figure 2A:
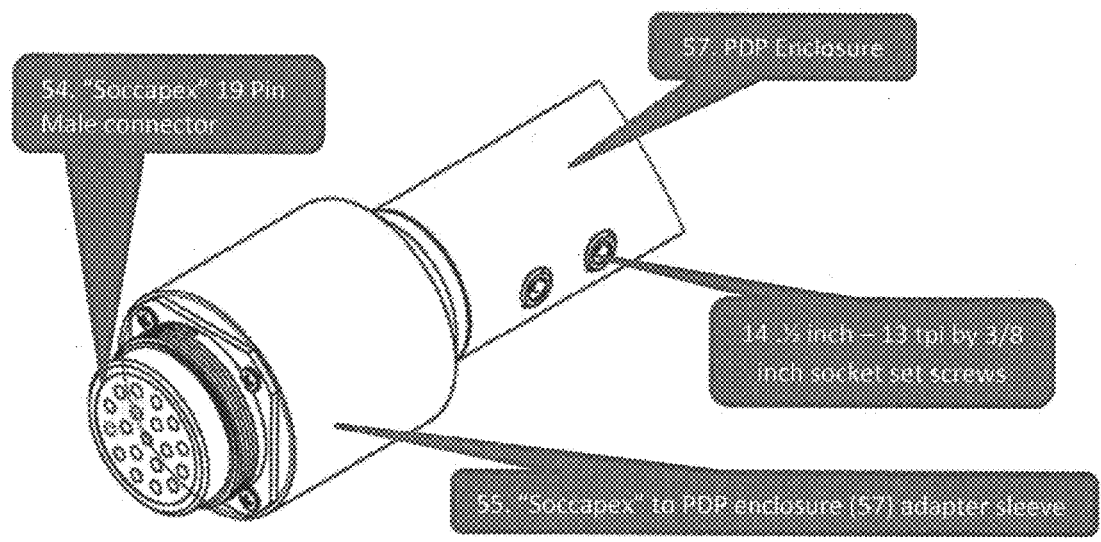
FIG. 2A is a further end view of the exemplary connector pipe.
Figure 2:
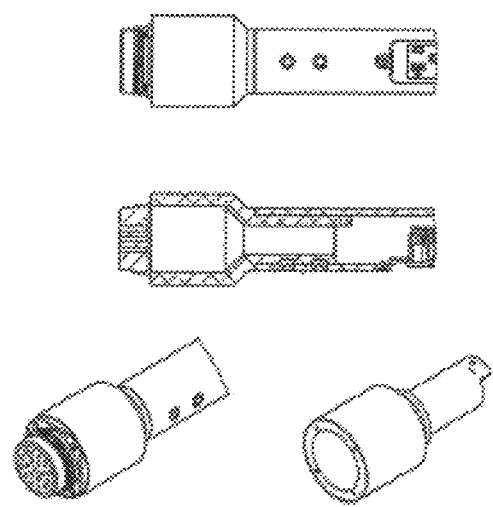
FIG. 2 are end views of the exemplary connector pipe.

Referring to FIGS. 1 and 2, in exemplary embodiments the tubular metal enclosure of PDP comprises a single-length hollow structure having a substantially uniform outside diameter, and an inside diameter defining a continuous internal wireway adapted for receiving and containing all wiring, data and power output connectors of the PDP. Spaced pockets are milled into a side wall of the tubular enclosure, and receive respective connector adapter plates for mounting standard electrical output connectors—e.g, a 20-amp Edison female receptacle for power, and the 5-pin XLR male or female connector for data communication. Edison connectors and 5-Pin XLR connectors have been in use for decades in the lighting and entertainment industry for connecting power and data, respectively. Utilizing these two connectors in a single location enable a tremendous amount of existing equipment to interface directly with the PDP without adaptors or rewiring. Other power and data connector combinations could be used and are within the scope of the present disclosure.

Figure 3:
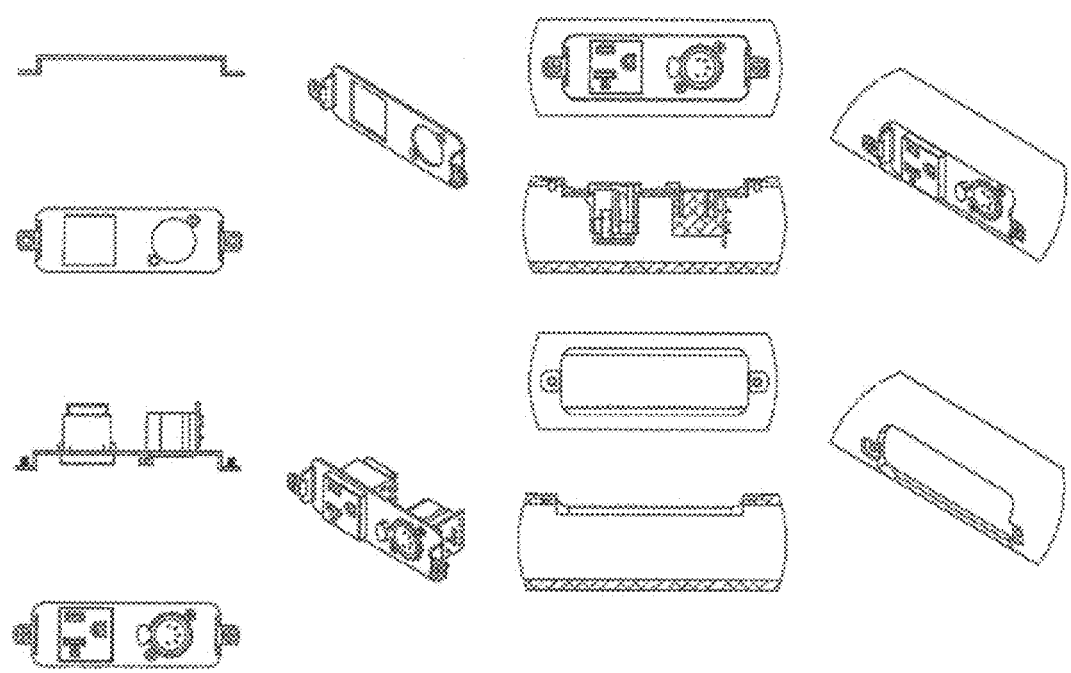
FIGS. 3 and 3A are fragmentary views of the exemplary connector pipe.

As best shown in FIG. 3, the exemplary connector adapter plate comprises a plate body defining separate cutouts for receiving and holding power and data output connectors, opposing spacer tabs located at respective ends of the plate body, and respective mounting tabs attached to the spacer tabs. The mounting tabs reside directly adjacent recessed fastener shelves formed with the enclosure at opposite ends of the outlet pocket. When the connector adapter plate is arranged within the outlet pocket, as best shown in FIG. 2, the spacer tabs locate the plate body sufficiently within the inside diameter of the enclosure for ready external access to output connectors through the outlet pocket, while no portion of the adapter plate or output connectors extend through the outlet pocket beyond the outside diameter of the enclosure. Each mounting tab of the connector adapter plate may have a countersunk fastener hole which receives a threaded fastener through the adjacent fastener shelf of the enclosure, thereby securing the connector adapter plate in a fixed position inside the enclosure.

In one exemplary embodiment, the PDP is constructed of Schedule 80 aluminum 1½" pipe, and is ETL listed to the UL 1579 Stage and Studio Standard as a "connector strip." The exemplary PDP is ETL listed to carry a load of 30 pounds per linear foot when supported on a maximum of 8-foot centers, thereby matching the loading capacity per linear foot of standard metal theatrical pipe. All power and data output connectors (or "outlets") are contained entirely within the interior of the tubular enclosure of the PDP, as previously described, such that attachment clamps and other pipe-attached devices can be located without obstruction at any point along the entire length of the PDP—even directly over unused output connectors.

The exemplary PDP can be constructed electrically with just one power circuit or up to as many as the electrical codes will permit. Utilizing the 12 gauge XLPE 125 degree C. wire type for the conductors, 16 conductors will fit into the 1½" Schedule 80 aluminum pipe used for the PDP enclosure, and 27 conductors will fit into the 2" Schedule 80 aluminum pipe used for the PDP enclosure, using the maximum 20% fill allowed for conductors in connector strips by UL 1573. For practical reasons, the standardized 1½" Schedule 80 pipe PDP enclosure have adopted a maximum of six circuits utilizing 12 conductors plus the ground conductor.

Referring again to FIG. 1, the new Power Data Pipe connector strip design, herein referenced as "PDP", dispenses with the traditional Connector Strip square or rectangular electrical enclosures by enclosing all of the wiring in a pipe with only the power feed supply wiring outside the connector strip pipe section(s). Power and Data outlets are within the circumference of the pipe, allowing attachment clamps to be located over the entire length of the PDP, even directly over unused outlets. Pockets are milled in the wall of extra strong schedule 80 pipe to recess the power and data receptacles inside the circumference of the outside diameter of the pipe. A receptacle connector adapter plate (8) is fastened into the milled pocket (36) and holds two standard outlets, the 20 amp Edison receptacle for power and the 5 pin XLR receptacle for data. The PDP, constructed of Schedule 80 aluminum 1½" pipe is ETL listed to the UL 1579 Stage and Studio standard as a connector strip. The PDP is ETL listed to support a load of 30 pounds per linear foot when supported on a maximum of 8-foot centers. This is the same loading per linear foot as a standard theatrical pipe.

Figure 1A:
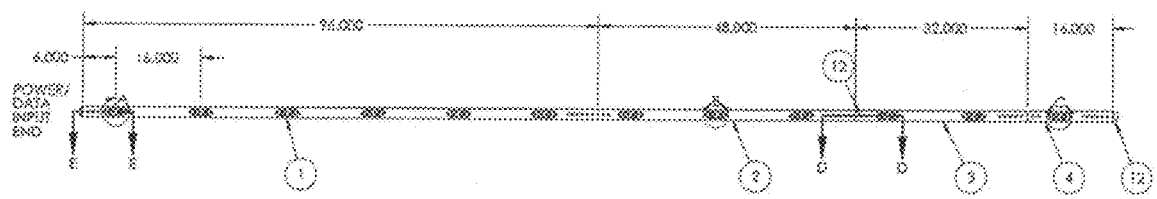
FIG. 1A shows the present electrical wiring connector pipe assembled together with similar pipe sections.

FIGS. 1 and 1A show the standard PDP enclosure (57) lengths built of pipe. 1. Is a 96 inch length with six outlet pairs, 2. is a 48 inch length with 3 outlet pairs, 3. Is a 32 inch length with two outlet pairs, and 4. Is a 16 inch length with a single outlet pair. Each outlet pair has a power and a data outlet. The standard PDP sections can be put together using the sliding internal splice sleeve (5) to make any length up to a maximum of 100 foot. A power only outlet could be substituted for an outlet pair for applications that do not require data. The end of all the enclosure sections is closed with a rounded End Cap (6). The power feed adapter, sliding internal splice sleeve (5) and the End Cap (6) are all secured to the PDP enclosure (57) with pairs of ½"-13 tpi×⅜ inch socket set screws (14).

In the greatest majority of the previous connector strip designs, an assembly was made of the connector strip body with lid and one or two structural pipe(s), typically one pipe below the connector strip, and sometimes one above and below the connector strip. The purpose of the connector strip is to distribute electrical power and the purpose of the pipe(s) is to support lighting fixtures as well as other items such as scenery, curtains, speakers, and etc. . . . . . The entire connector strip assembly is joined together with brackets and suspended with a variety of methods from the building structure. Often pipes are used without the connector strips to provide additional unpowered locations for curtains, scenery, lighting fixtures and accessories and to reduce the total installed cost. The PDP does away with the need for a separate connector strip and simply uses the pipe body as the electrical enclosure to contain all of the electrical power and data circuits. The PDP does not require permanent wiring to the building. PDP pipe sections that are utilized for curtain and scenery pipes will distribute electrical power and data over the entire pipe when needed by simply plugging in the PDP to a flexible power drop.

FIG. 2A is a standard 19 pin male circular connector (see also, FIG. 2), often called a "Soccapex" (54), that is attached to the feed end of the PDP enclosure (57) with the Soccapex adapter sleeve (55). The Soccapex connector is fastened to the Soccapex adapter sleeve with four threaded fasteners. The Soccapex adapter sleeve is fastened to the PDP enclosure (57) with two ½ inch—13 tpi by ⅜ inch socket set screws (14). The Soccapex connector (54) is wired directly to the internal power conductors by soldering or mechanically crimping pins to the conductors. The "Soccapex" connector (54) is often used to distribute power in the entertainment industry. Many theaters have these power distribution cables readily available, above and adjacent to the stage, in their fly lofts and could easily connect them to the PDP to supply up to six electrical power circuits.

Edison connectors (9) and 5 Pin XLR connectors have been in use for decades for connecting power and data respectively in the lighting and entertainment industry. Utilizing these two connectors in one location allows a tremendous amount of existing equipment to interface with the invention without adaptors or rewiring. Other power and data connector combinations could be used and are within the scope of the invention.

Figure 3A:
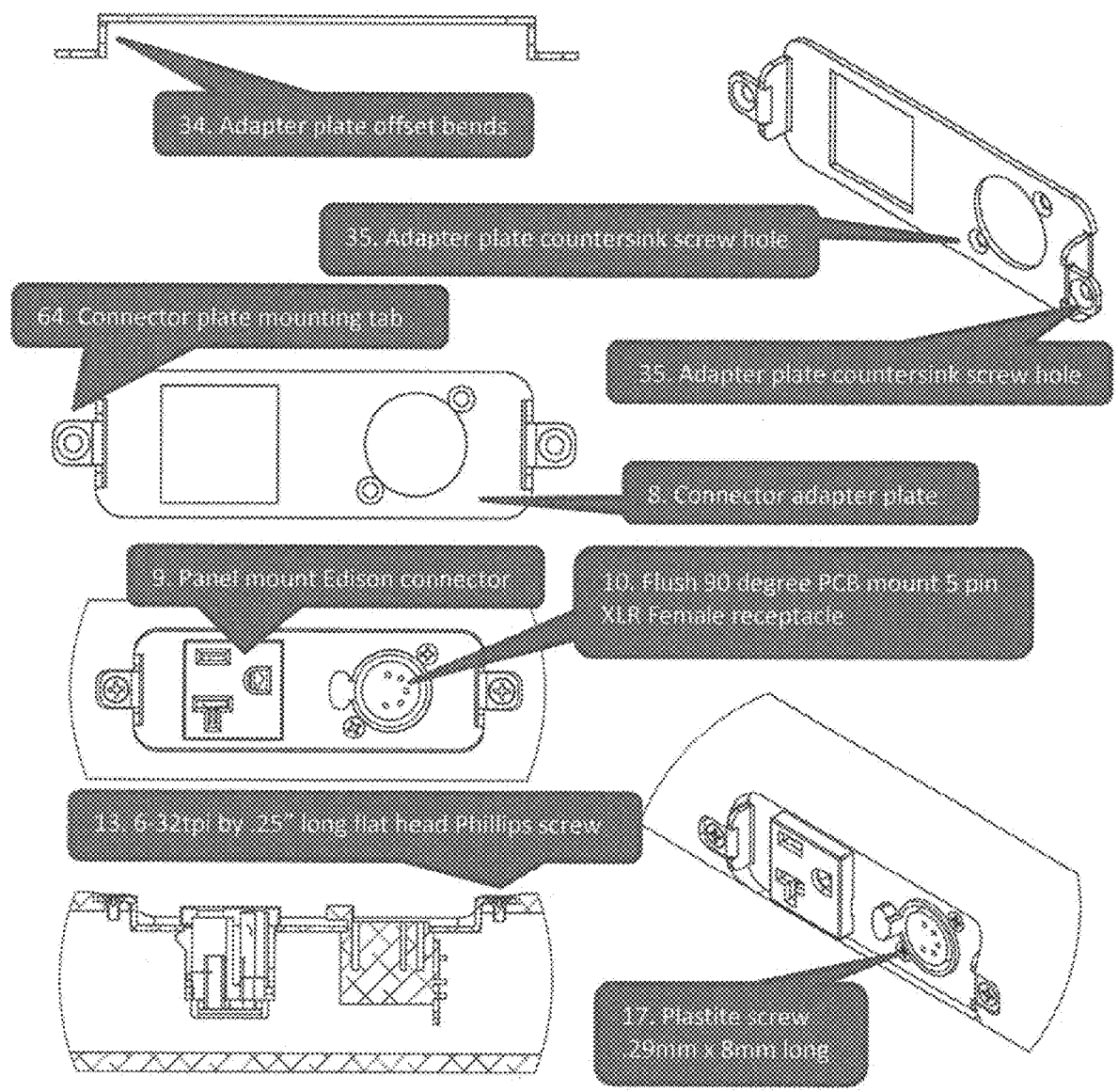

FIG. 3A includes views of the PDP with the connector pairs of an Edison connector (9) and a 5 pin XLR connector (10). The pair of connectors are mounted to a connector adapter plate (8) that is in turn mounted with two threaded fasteners (13) through countersink screw holes (35) on the connector plate mounting tab (64) into a milled pocket (36) in the side wall of the PDP. See also FIG. 3.

Figure 4:
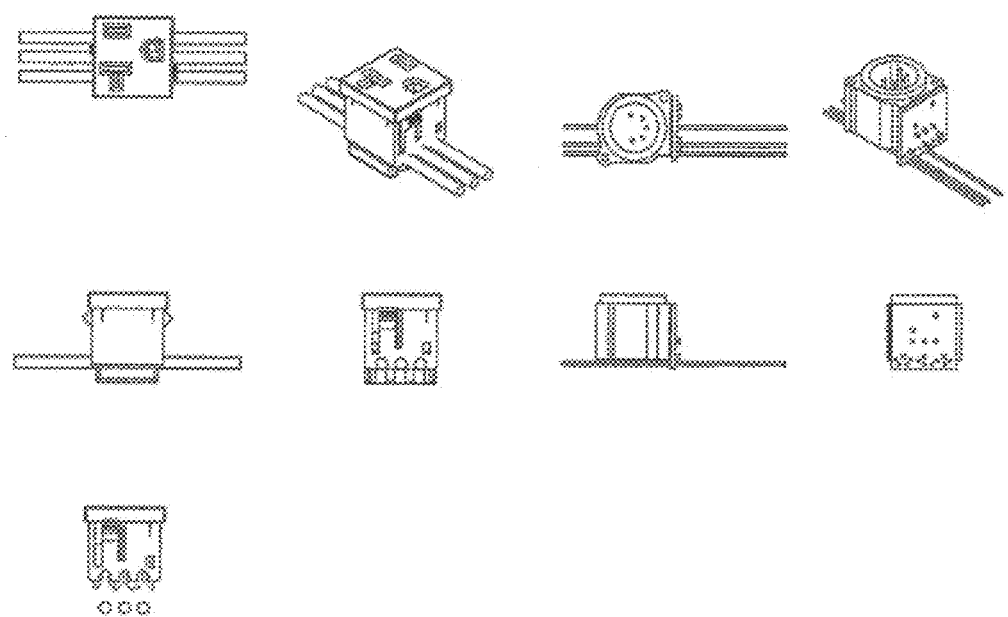
FIGS. 4, 4A and 4B are views of an exemplary panel mount Edison connector.
Figure 4A:
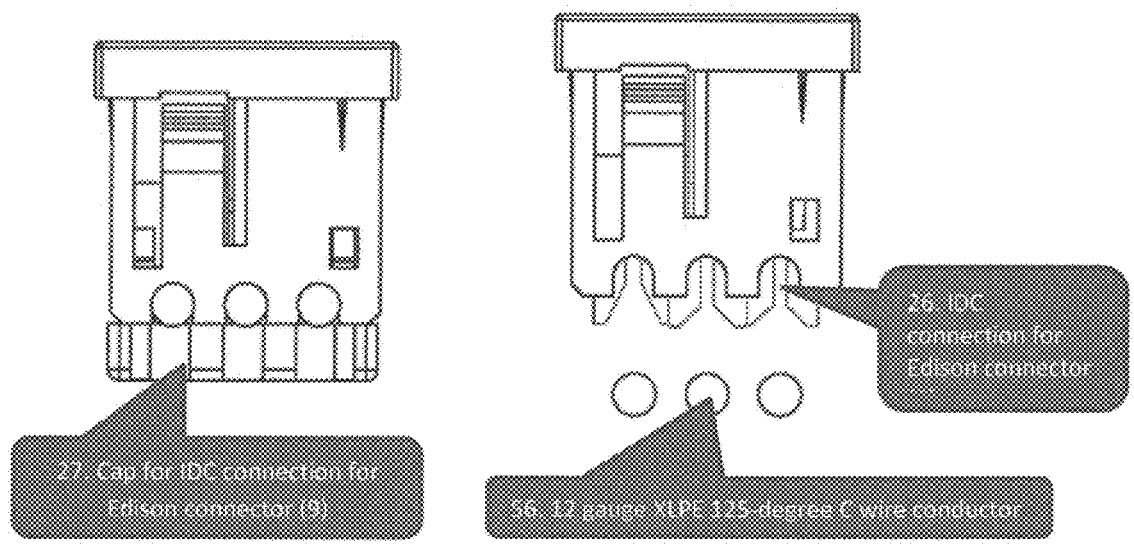

FIG. 4A includes two views of the flush Edison Insulation Displacement (IDC) connectors used in the PDP to minimize the wiring connection space in the electrical enclosure. These Flush mount Edison connectors are held in place with snap lock tabs (28) on Panel mount Edison connector (9) that lock into the connector adapter plate. The IDC wire connection (26) uses the absolute minimum space to make the connections from the Edison connectors (9) to the 12 gauge XLPE 125-degree C. wire conductors (56) This space reduction on the wire terminations makes it possible to assemble the PDP wiring and connectors inside the PDP enclosure. The cap (27) for the IDC Edison connector (9) encloses all the power wiring connections with all the necessary electrical clearances and prevents problems from wires (56) from pulling out of the IDC connector.

Connector Strips have been traditionally constructed of fabricated sheet metal or of aluminum extrusions comprising an enclosure body and enclosure cover. This two-part construction facilitated wire splicing of the internal power connections of the external power cords or flush outlets. As data usage became more prevalent in the entertainment industry, connector strips have added data outlets along with the power outlets. These data outlets have traditionally been located in separate compartments to comply with electrical codes for separation of different classes/voltages of wiring.

Figure 4B:
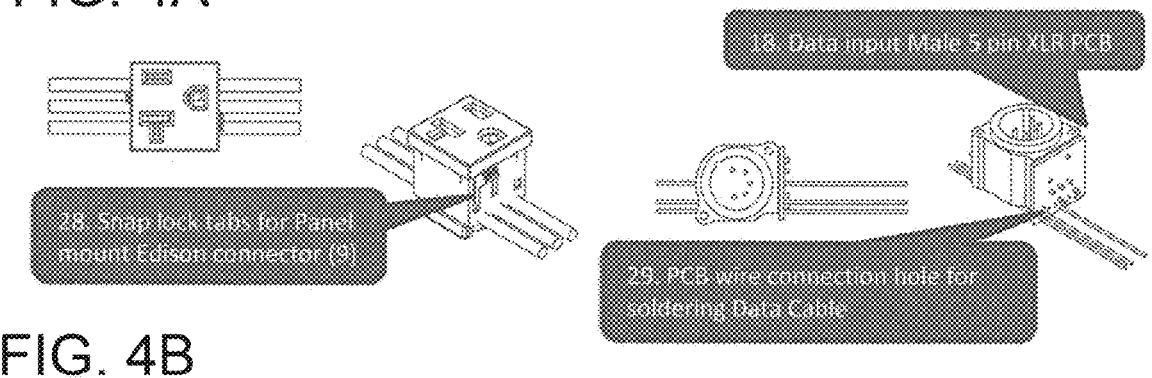

FIG. 4B shows the 300 volt rated wiring that is connected to both the Edison connector (9) and the 5 pin XLR connector. See also FIG. 4. The data wiring connected to the 5 pin XLR runs through a PCB board (18) to facilitate easy wiring of the PDP. The data wiring is soldered through holes (29) in the PCB for reliable data connections. Not shown is the 300 volt rated data cable jacket with braid and foil jackets that are used to protect the twisted pair data wires from physical damage and electrical signal interference. Heat shrink is used to cover the bare common or drain wire, and is also used to cover the braid and foil jackets to prevent the possibility of an electrical short between the data wiring and either the PDP housing or the power wiring.

The PDP does away with the need for the traditional Connector Strip enclosure by enclosing all of the wiring in the suspended pipe itself. Previously the power and the data wiring have been run in separate compartments. However, there is an exception to this separation rule in the UL 1573 Stage Studio standard in UL 1573 28 Separation of Circuits 28.1 "Conductors of two circuits involving different voltages, such as between a limited-voltage/current circuit and a line voltage circuit, shall be separated from each other by a barrier or segregated as specified in 28.2 unless the conductors of both circuits are insulated for the maximum voltage of either circuit." Using this section of the standard, if the lower voltage (data in this case) wiring is provided with the same voltage insulation as the highest voltage wiring required in the enclosure, and the data is related to the power circuits, then both may co-exist in the same enclosure. The PDP (Power Data Pipe) utilizes this format of using the same high voltage insulation for both power and data wiring, with the Data wiring controlling the devices attached to the power wiring, to run both the power and data wiring in the same enclosure. The requirement for separation of Data wiring from the power wiring is overcome by utilizing Data wires with the same voltage insulation as the requirement for the power wiring.

Figure 5:
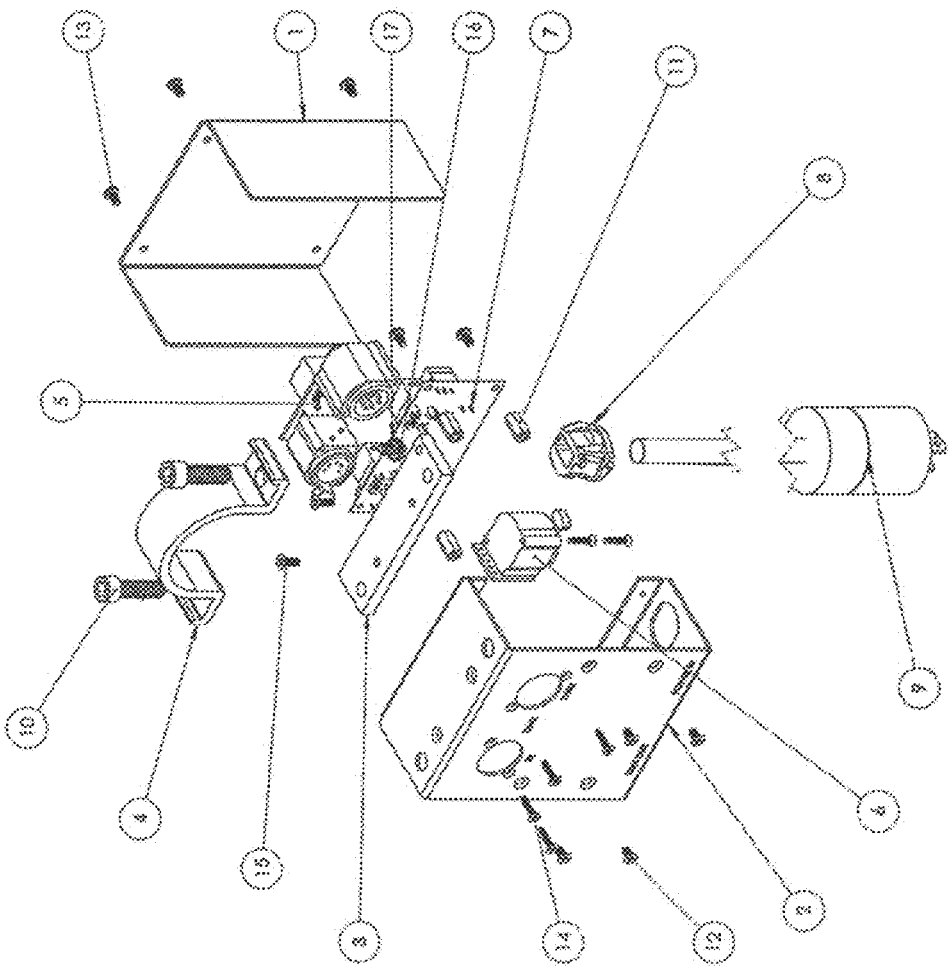
FIG. 5 is an exploded view of an exemplary DMX splitter box.
Figure 6:
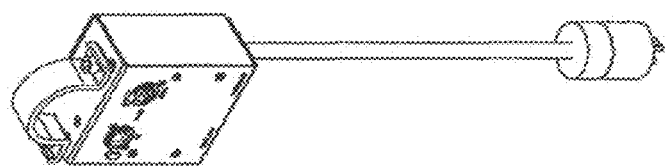
FIG. 6 is a further view of the exemplary splitter box.
Figure 6:
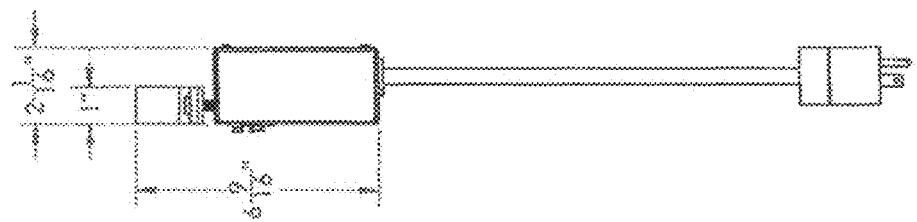
Figure 6:
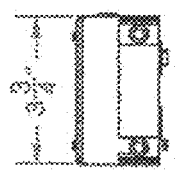
Figure 6:
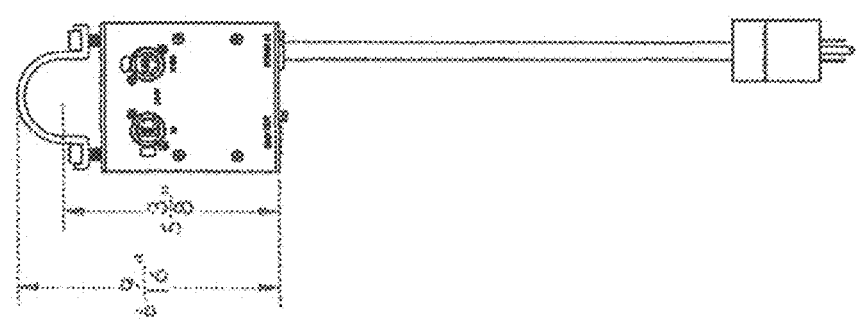

The Data most often used by the entertainment industry for lighting control is formatted according to the DMX 512 standard and utilizes RS-485 serial data communication hardware and wiring for transmitting and receiving the data. The Data running into each PDP is brought to full strength by retransmitting the data either internally to the PDP or in close proximity to the PDP. The retransmitting of the data is provided to maximize signal strength, and minimize interference from the close proximity of the alternating current power wiring to the data wiring. There are many commercially available DMX regenerators that could be used for this purpose. We made our own DMX regenerator to perfectly match the PDP's application needs. The PDP's DMX regenerator has standard DMX data input and pass through to the next device on the DMX serial string. The PDP's regenerator simply repeats the DMX signal from the input and re-broadcasts the signal to the output connector. The exemplary embodiment uses a 5 pin XLR male to female cable to bring this signal from the regenerator into the PDP through a data input male 5 pin XLR (18) that is in the first milled pocket (36) position on the PDP. The PDP regenerator receives its 120 volt power through an Edison cable plugged into the first milled pocket (36) position Edison outlet on the PDP. This new retransmitted signal goes out to the PDP and is available to supply the data needs of connected fixtures. The PDP regenerator is shown in FIGS. 5 and 6, and has an integral pipe mount for easily attaching to the PDP. The short 5 pin XLR cable is not shown but plugs into a flush 5 pin XLR connector mounted on the same electrical box face as the Edison cable.

Each PDP power circuit terminates in one or more combined power and data outlet(s), or one or more power outlet(s). With the advent of LED fixtures using greatly reduced power and containing internal electronics requiring data, a single power circuit per connector strip outlet that is controlled from a remote dimmer is no longer required or advantageous. Ten or more LED fixtures can be typically run on a single 20 amp circuit and up to 32 LED fixtures may be controlled with a single serial data channel, typically called DMX 512 using an industrial data network typology RS-485. DMX 512 protocol requires that the DMX 512 data must run in serial fashion from the control source over RS-485 Data Cable (20) to the first fixture, to the second fixture, to the next fixture, and so on . . . . The standard DMX 512 transceiver will talk to 32 standard DMX 512 devices. There are alternate DMX 512 receivers that draw less power from the serial data stream and will operate up to 64, 128 or 256 devices on the data stream respectfully.

The last data outlet in each PDP is terminated by placing an appropriately sized resister (typically 120 Ohm) across the data plus and data minus pairs. This is standard industry practice, but by providing this termination internally to the PDP, the end user does not have to provide this termination on the connected equipment at the appropriate locations. The termination is essential to a proper working data stream, and by including it at the end of the PDP data stream, the internal termination ensures that the system data integrity will be maintained without user intervention. This makes the PDP system much easier to use than the traditional systems.

The DMX 512 data is broadcast to all fixtures and not changed by any of them in a proper working system. Up to 512 pieces of data are sent and each piece of data is a binary value representing a decimal value of 0-255. The controller's instructions are decoded by each fixture. The fixtures have an individual address of 1 to 512, and utilize only the data for that address. Some fixtures use more than one piece of data, pulling all the required data sequentially from the starting address onward. There are single fixtures that may use up to 25 DMX 512 data pieces or more.

Most portable DMX 512 devices have a data input connector and a data through connector. Presently a separate DMX 512 cable must be plugged into each device in a series fashion for the DMX 512 data to pass through. This means that most DMX 512 fixtures have two data cables, one data in cable and one data through cable to run to the next fixture. This can create a long string of cables that are prone to failures from the interruption of the control signal at any point. If the control signal is interrupted at any point, all fixtures further down the line no longer receive their data. This embodiment prevents this data interruption chain by providing extremely reliable soldered connections to all internal PDP DMX data ports, providing each fixture with its own data.

The end of the DMX 512 data chain must have a termination resistor, typically 120 ohm and connected between the data+ and the data− lines, to inhibit data from reflecting back down the data line and causing the DMX devices to receive essentially two superimposed DMX 512 control signals that are out of phase with each other. The end of the DMX 512 serial data stream is always terminated internal to the PDP, so users no longer need to terminate the any fixtures in the PDP data stream. This internal data termination saves time and preserves system data integrity.

Figure 10:
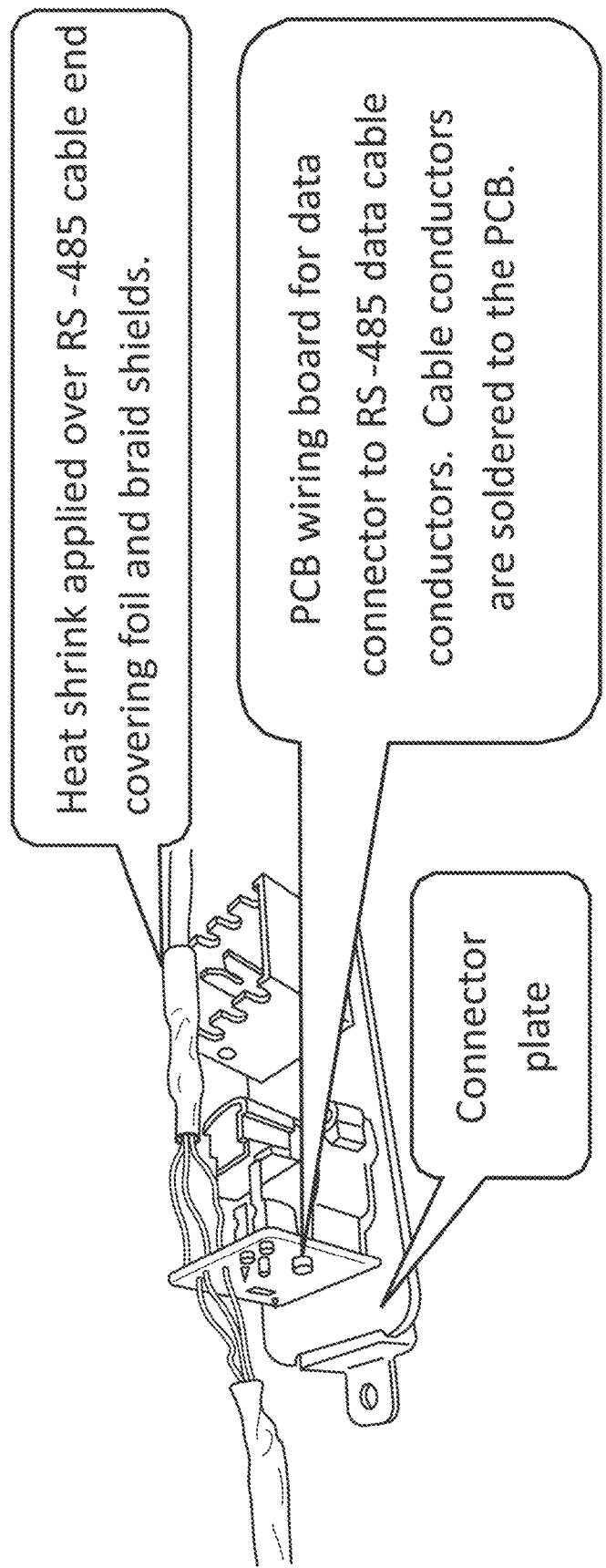
FIG. 10 illustrates an exemplary connector plate and PCB wiring board.

Referring to FIG. 10, on the last connector adapter plate of every PDP run there is a flush 90 degree PCB mount 5 pin XLR female receptacle with the 120 ohm terminator resistor (11) installed across the data pair to inhibit data reflections.

Each fixture taps into the DMX 512 data stream that resides internal to the PDP by plugging directly into one of the PDP's data output connectors. With the PDP system it is not necessary to run cables from one fixture to the next fixture for either power or data. This is a major time and reliability advantage.

In this exemplary embodiment of the invention the spacing of the individual power and/or data outlets is 16 inches on center. The objective in setting the spacing of the outlets at this distance is to ensure that all of the potential fixtures have a convenient outlet pair adjacent to the lighting fixture without needing to use extension cables. These outlets may be on a single 20 amp circuit for the entire PDP, or multiple circuits staggered along the PDP. The longer the PDP or the higher the power requirements of the fixtures, the higher the requirement is for multiple circuits. Multiple circuits may also be required if a mix of traditional incandescent lighting fixtures is present.

There are applications where only the power distribution is required, and in this application the PDP can be utilized as a traditional connector strip without the additional data. The invention does not require that Data is included for the PDP system to be complete.

Figure 11:
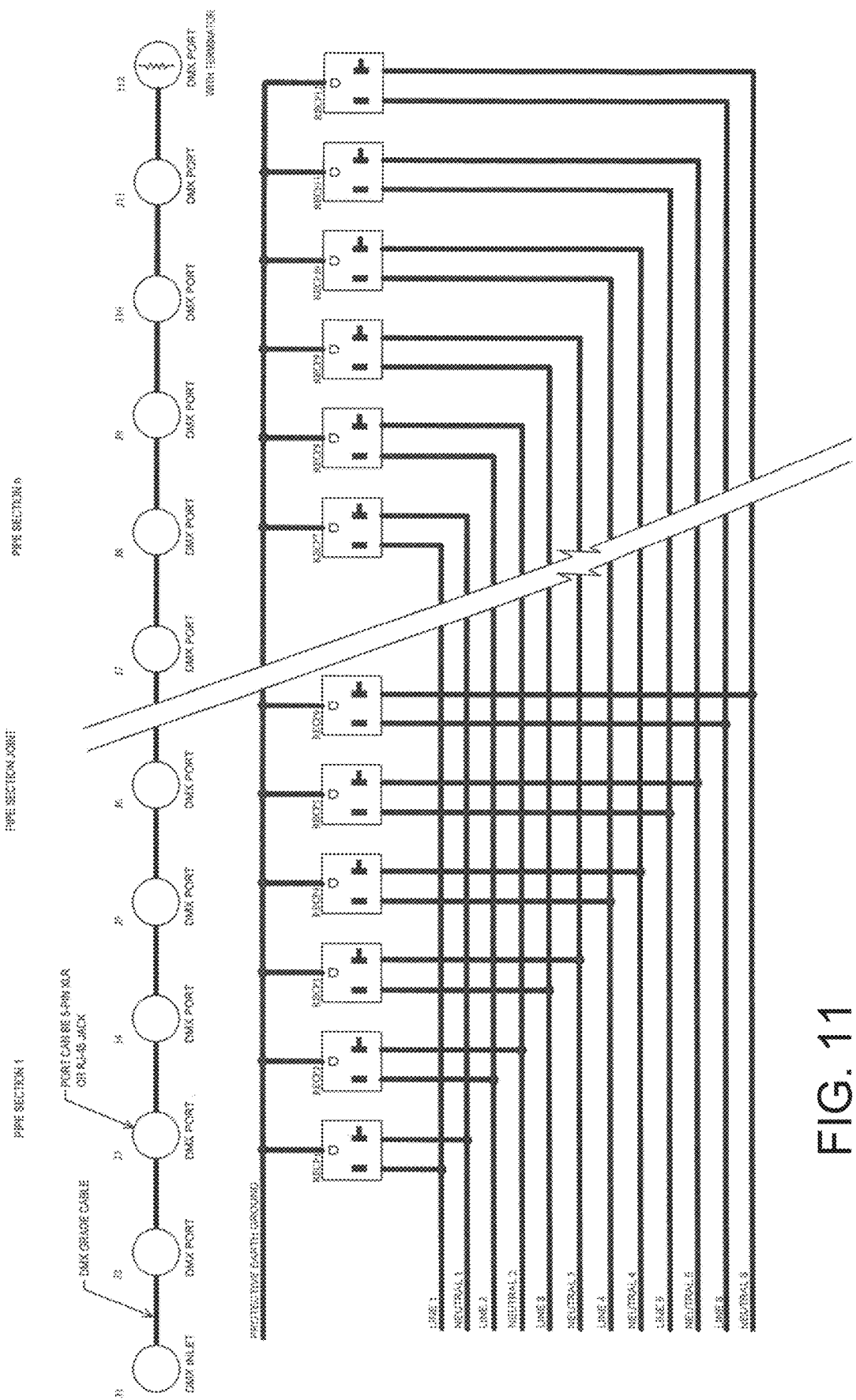
FIG. 11 a representative wiring schematic for the PDP connector strip.

FIG. 11 is a representative wiring schematic for the PDP connector strip with six circuits and twelve outlets. Note that the Data connections are all in a series circuit, and the power outlets are in six parallel circuits of two outlets. The number of power circuits may vary from one up to six. All ov=f the power outlets could have been connected to only one circuit for a lighter duty application.

Referring to FIGS. 7, 7A, 7B, and 7C, the PDP may receive its power and data feeds in many ways. The feed box will normally house the power input connection terminal strips and the feed wiring from the building. The feed box is based on a traditional connector strip and has integral labeled terminal blocks for bringing in the feed wiring connections. There is a feed enclosure and a lid. The PDP end of the feed box enclosure is secured to the PDP with a standard one inch conduit nut through a knockout or hole in the feed box wall that is threaded into an externally threaded feed adapter sleeve protruding from the PDP. The feed box adapter sleeve is held into the PDP enclosure (57) by two ½"-13 tpi×⅜" socket set screws (14) threaded through the wall of the PDP. The feed box adapter sleeve is threaded externally at the feed end of the PDP and has a shoulder that stabilizes the feed box flush to the end of the PDP enclosure (57). The feed box enclosure may be axially adjusted on site to the most convenient location for wiring the connections and then secured by the set screws.

Figure 7:
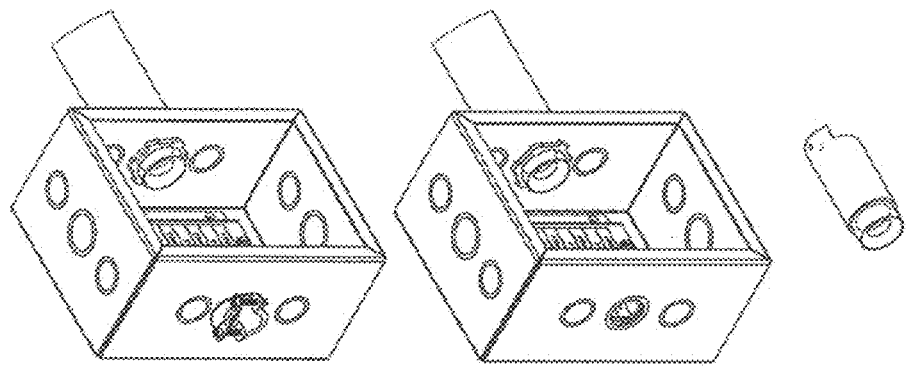
FIGS. 7, 7A and 7B are views of an exemplary feed box enclosure.
Figure 7:
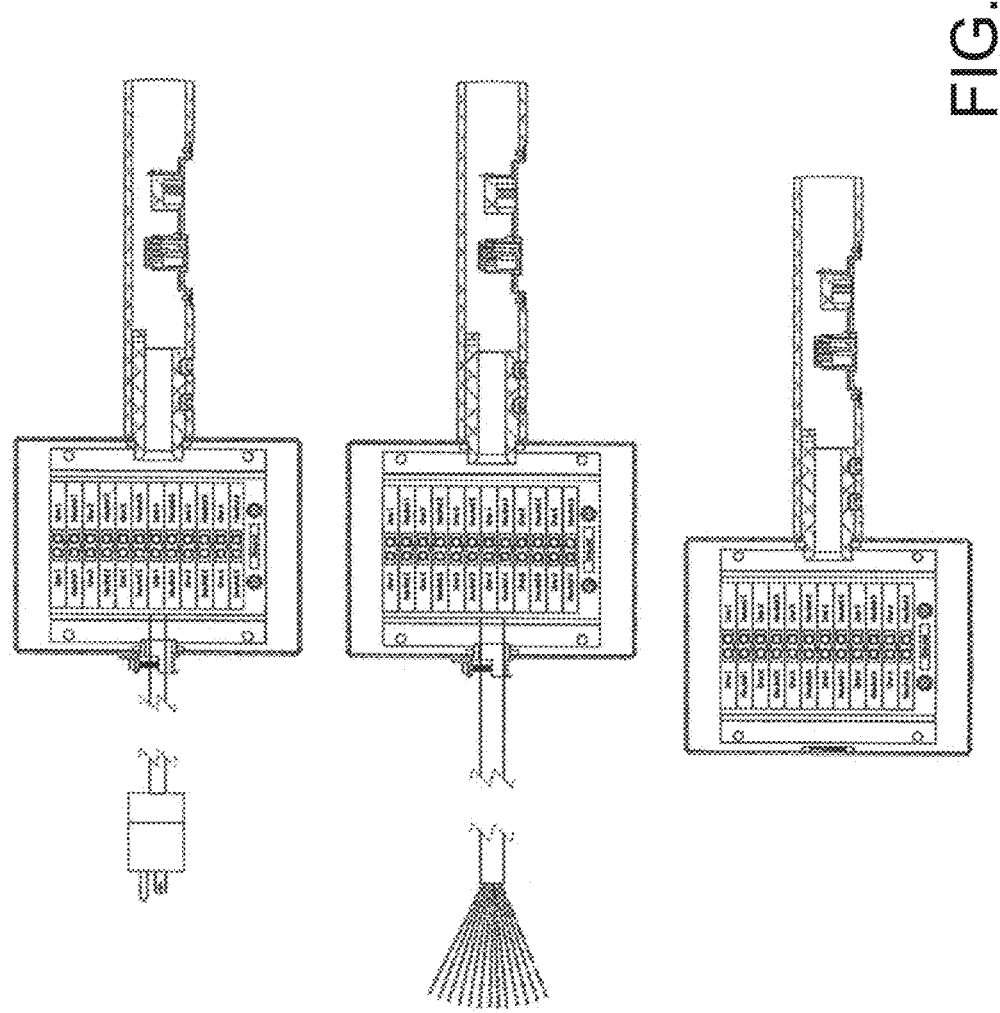
Figure 7A:
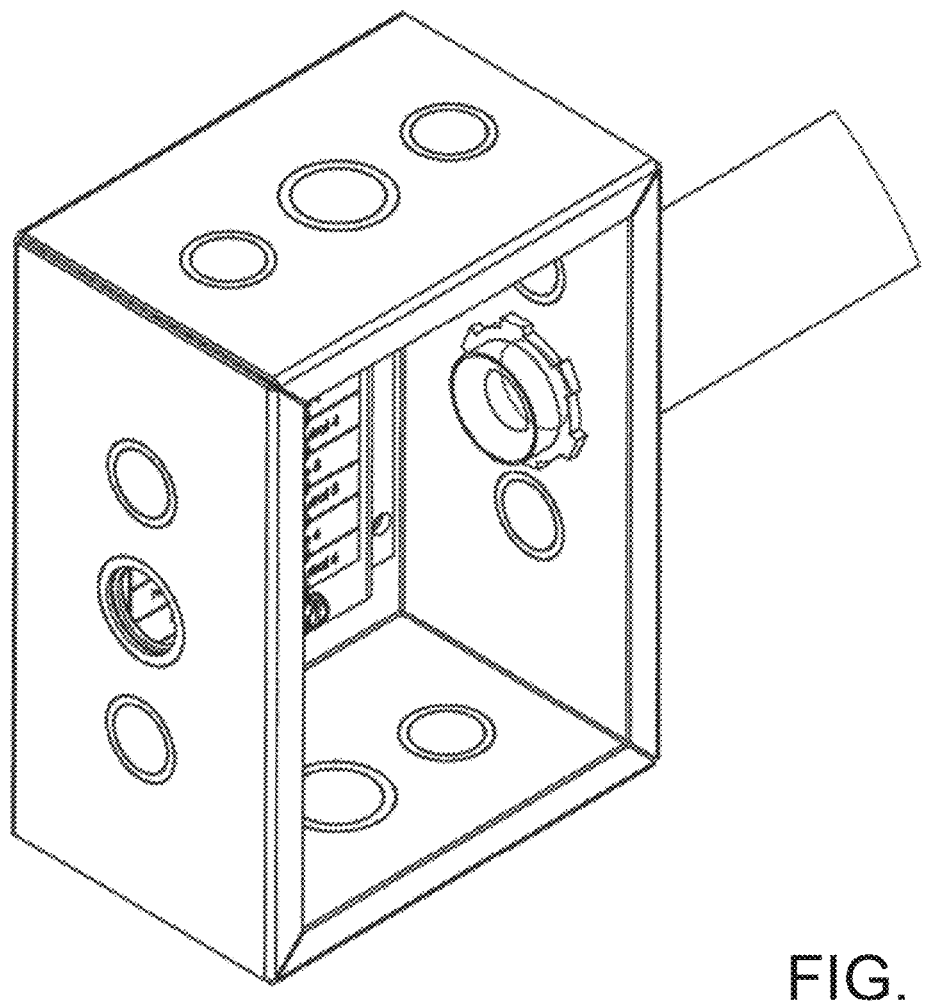
Figure 7A:
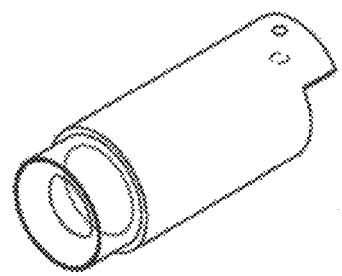

FIG. 7A shows the feed box and the feed box adapter sleeve showing the large radius wiring inlet and the one inch NPT threads for connecting to the feed box at the left, and the threaded through hole at the reduced section for making a ground connection. The feed box shown in FIG. 7A has standard electrical knock outs for making the electrical connections to the building. Also seen is the one inch NPT lock nut securing the feed box to the feed box adapter sleeve.

Figure 7B:
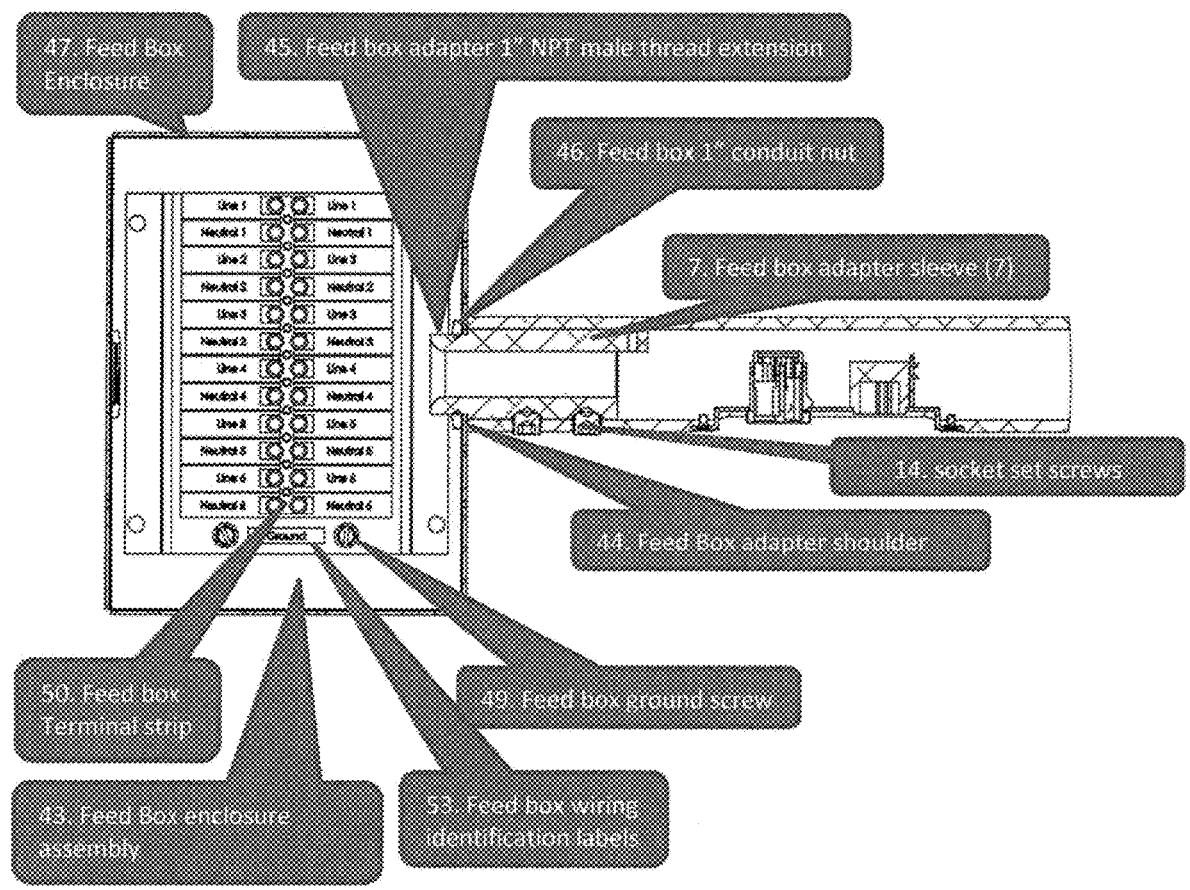

FIG. 7B is a cross section of the feed box enclosure assembly (43) showing the feed box enclosure (47), the one inch conduit nut (46) securing the feed box (47) to the feed box adapter sleeve (7), the feed box adapter shoulder (44) and the two socket set screws (14) attaching the feed box adapter sleeve (7) to the PDP enclosure (57) body adjacent to the first milled pocket (36) in the PDP enclosure (57) body that is used for the data input and to power the data regenerator. Centrally located Inside the feed box (47) is the terminal strip (50) used to connect the electrical power circuits from the building supply to the PDP wire circuits. The cover plate would be fastened in place after all wiring connections in the feed box (47) are complete. The wiring has been omitted for clarity, but would run from the feed box assembly (43) through the interior of the feed box adapter sleeve (7) and into the PDP enclosure (57). The circuit labels (53) for the wiring installation are fastened to the rear of the feed box enclosure (47) on either side of the terminal strip (50). The grounding connections (49) are located below the terminal strip (50).

The power connections to the feed box (47) may be made by standard conduit connections to the feed box, standard NEMA flush connectors mounted into the feed box providing one to three feed circuits, extra-hard usage flexible cable connected to the end of the feed box with a Kellems strain relief, a 19 pin male "Soccapex" or equivalent circular multi-connector may be mounted on the feed box, or various other wiring methods.

Power inputs may be directly run into the PDP without a feed box by using an adapter sleeve. A standard NEMA connector providing for one to three feed circuits may be attached to a extra hard usage cord such as SO cable attached to an adapter sleeve with a strain relief. A 19 pin male "Soccapex" or equivalent circular multi-connector may be mounted directly to the "Soccapex" adapter sleeve with either mechanically crimped or soldered wiring connections directly to the PDP's internal power wiring.

The most unique method of feeding the power circuits to the PDP is extending the PDP's internal power wiring out of the PDP through an internally threaded adapter sleeve (65) and through standard conduit connections directly into an external building electrical junction box for wire terminations. The power wires of the PDP are both color coded by the colors of the wire jacket and labeled for identification by printing directly on the conductors. The label printing is repeated in short intervals along the length of each conductor. This individual identification on the PDP connector strip wiring is unique to the industry and allows the identification of the individual electrical circuits and connection of the wires into an external junction box. The circuit conductors are labeled L1, N1; L2, N2; L3, N3; L4, N4; L5, N5; L6, N6 and Ground. The "L" stands for Line, the "N" stands for Neutral. Only the wiring for the number circuits that are required are installed in the PDP as needs may vary from job to job.

Figure 7C:
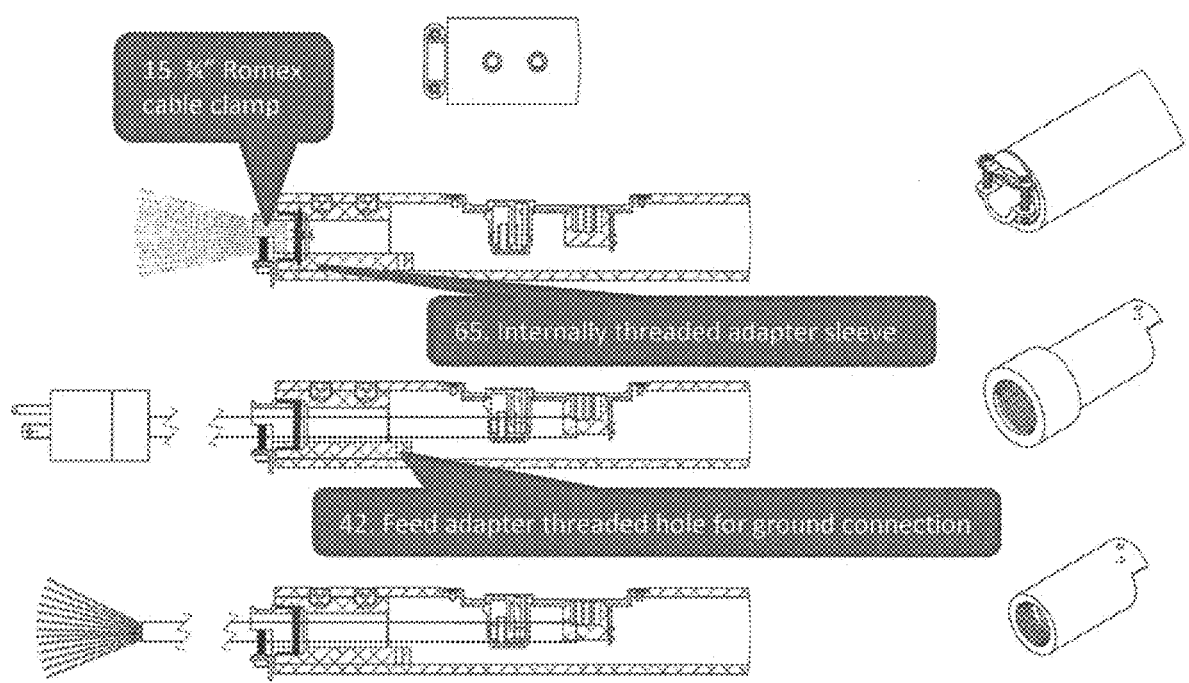
FIG. 7C illustrates an exemplary internally threaded adapter sleeve.

The reduced section feed adapter threaded hole for ground connection (42) is seen in FIG. 7C along with the power adapter sleeve installed in the PDP enclosure (57) and secured by the ½ inch 13 tpi by ⅜ inch long cup point socket set screw pair. Also represented in FIG. 7C are three methods of feed wiring utilizing the adapter sleeve. In FIG. 7C, the top wiring drawing represents the internal wiring conductors if they are extended out of the PDP to be enclosed at the job site in standard conduit system for connection into a building junction box. These conductors are strain relieved for shipping as shown with a Romex clamp (15) to prevent damaging wiring connections in the PDP enclosure (57). The middle wiring drawing represents an extra hard usage cord such as a 12/3 or 12/4, or 12/5 SO cable with a standard NEMA connector installed. The bottom wiring drawing represents an extra hard usage cord such as a 12/3 or 12/4, or 12/5 SO cable that would be directly connected to a building junction box for wiring connections. In FIG. 7C, the top drawing shows a bottom view of an installed power adapter. The top right shows an ISO view of an installed power adapter. The middle right drawing shows a power adapter threaded for ¾ inch conduit connections. The bottom right drawing shows a power adapter threaded for ½ inch conduit connections. The middle and bottom right drawings show the threaded hole for the grounding connection at the far right. This grounding connection is also visible in the wiring section views at the right of the power adapter.

All power feed wiring utilizing an adapter sleeve make the system grounding connection directly to the adapter sleeve. The grounding circuit maintains continuity throughout the entire the PDP enclosure (57) section(s) from the power adapter sleeve, through all of the sliding internal splice sleeve (5)s all the way to the End Cap (6). The PDP's internal grounding conductor running to all of the output connectors also makes its grounding connection at the adapter sleeve. Both the ground conductor from the external power feed and the PDP's internal grounding conductor have a mechanically crimped ring terminal fastener connected to the grounding conductors and both of these ring terminals are then fastened to the threaded hole in an inside face of the feed adapter sleeve with a threaded fastener.

The PDP body may be directly threaded for ½ inch or ¾ inch conduit fittings to enter radially at the feed end without a feed box if the wires extend through a threaded conduit connector and conduit to be connected into an external junction box. In this case the circuit grounding connection is made to an additional endcap, placed on the feed end of the PDP, with provision for the grounding connection by adding a threaded hole to an inside face of the endcap for making the grounding connection. The grounding circuit maintains continuity throughout the entire the PDP enclosure (57) section(s) from the feed End Cap (6) through all of the sliding internal splice sleeve (5)s to the far End Cap (6) by the connecting socket set screw's cup point digging into the metal of the connection. The grounding conductor running to all of the output connectors also makes its grounding connection at the feed End Cap (6). Both the ground conductor from the external power feed and the PDP's internal grounding conductor have a mechanically crimped ring terminal fastened to the grounding conductors and both these ring terminals are then fastened to the threaded hole in the inside face of the endcap with a threaded fastener.

Other methods may be used to feed the PDP and be within this invention.

The data input connections may be hard wired to internal terminal strip connections in the power feed box, or brought into the feed box through 5 pin XLR, 3 pin XLR, or Ethercon flush mounted connectors, or by a wireless DMX 512 signal converted to wired DMX 512 internal or external to the PDP feed box. In the exemplary embodiment of the invention the DMX 512 signal re-originator is provided by an external control box that is secured to the PDP at the power feed end of the PDP and plugged into the DMX 512 XLR male data connector in the first milled pocket (36) in the PDP. It is essential that whatever method is used to bring in the DMX 512 control signal to the PDP that the Data is re-originated in close proximity, or internal to the PDP, to ensure sufficient signal strength and to maintain signal reliability.

Any power receptacles, or combination of power and data receptacles could be used together or individually and be within the scope of this invention. Non-standard connector sets could be used or created to provide the power and data connections required for the PDP and are within the scope of the invention.

The PDP utilizes an electrical requirement that the receptacle be sized the same as the branch circuit protection provided. The exemplary embodiment of the invention utilizes 20 amp receptacles with 20 amp branch circuit protection. The required branch circuit protection is provided upstream of the invention by the building power distribution system.

Figure 12:
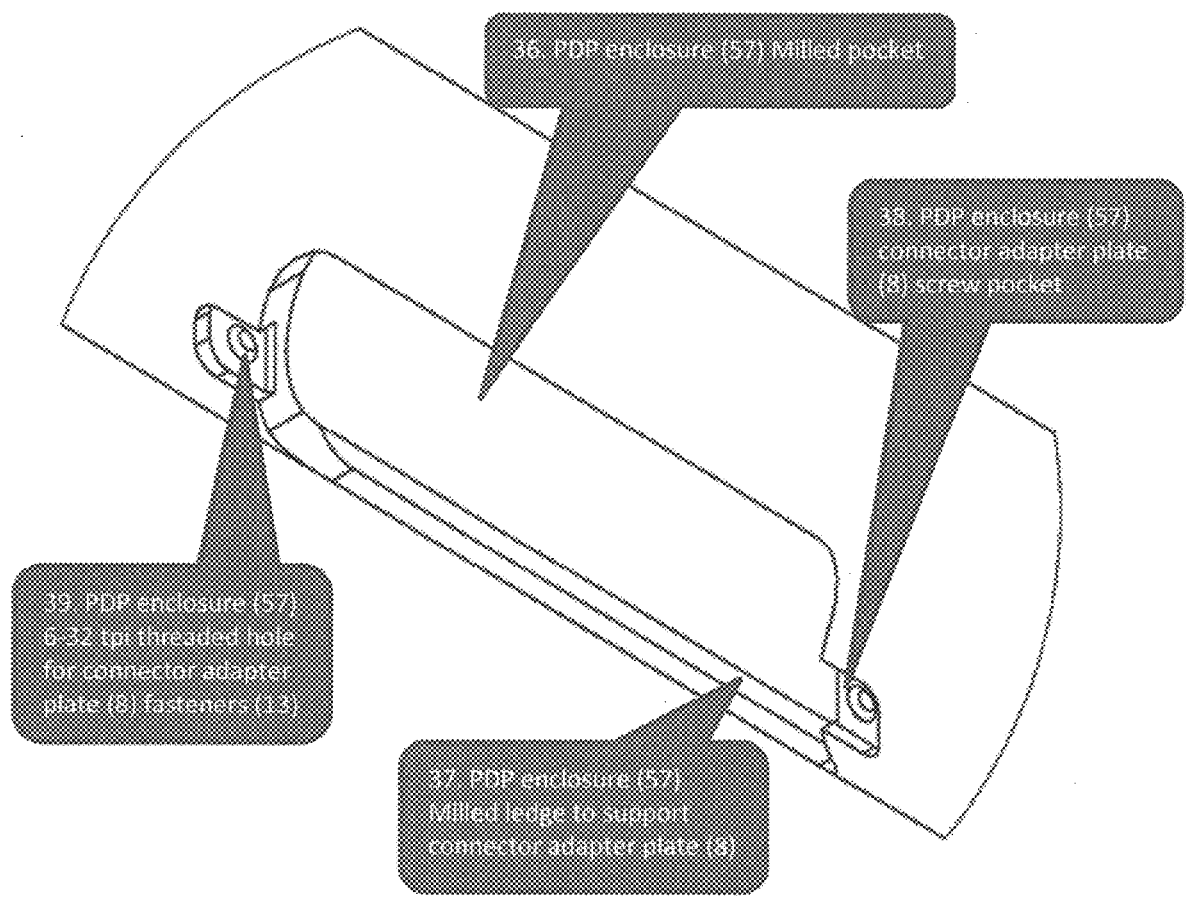
FIG. 12 shows a fragmentary portion of the exemplary connector pipe.

The exemplary embodiment of the invention uses panel mounted Edison receptacles mounted in a connector adapter plate (8) fastened into a milled pocket (36) of the PDP. The milled pocket (36) is seen in FIG. 12 in an ISO view. Note the pockets (38) for the connector adapter plate (8) screw tabs to recess into. These pockets (38) prevent the plate from extending above the perimeter of the PDP enclosure (57). The connector adapter plate (8) fastens to the PDP enclosure with fasteners (13) secured into the 6-32 tpi threaded holes (39). Also note the milled ledge (37) at the bottom of the milled pocket (36). This milled ledge shoulder (37) supports the connector adapter plate (8) when a connector is being inserted into the power or data connectors mounted on the connector adapter plate (8). The connector adapter plate (8) is nested into the PDP enclosure (57) milled pocket (36) to enclose the wiring connections and provide an interference fit with the PDP enclosure (57).

Another arrangement used for power and or data outlets in traditional connector strips are called pigtails and are included in the invention. Pigtails are short lengths of extra hard usage cable that would be secured to the connector adapter plate (8) and terminated inside the PDP to its supply circuit and supplied with a cord end receptacle at the other end of the extra hard usage cable. Pigtails on the PDP will restrict the placement of lighting fixtures by protruding from the PDP enclosure (57), whereas in the exemplary embodiment, flush connectors, allow complete freedom in placing lighting fixtures and accessories continuously along the PDP. Pigtails as utilized in this exemplary embodiment of the invention would provide power, data, or both power and data with a combined cable end receptacle.

The PDP can be constructed electrically with just one power circuit up to as many as the electrical codes will permit. Utilizing the 12 gauge XLPE 125 degree C. wire type for the conductors, 16 conductors will fit into the 1½" schedule 80 Aluminum pipe used for the PDP, and 27 conductors will fit into the 2" schedule 80 Aluminum pipe used for the PDP, using the maximum 20% fill allowed for conductors in connector strips by UL 1573. For practical reasons, the standardized 1½" schedule 80 pipe PDP sections have adopted a maximum of six circuits utilizing 12 conductors plus the ground conductor.

The PDP may be permanently or temporarily connected to the electrical supply. No internal circuit protection is required in the PDP as the circuit protection comes from the branch circuit protection outside of the PDP. The branch circuit protection must match the PDP's wiring and receptacles. Typical branch circuit protection circuit breakers would be 20 amps for all of the constructions shown in this application. Larger receptacle sizes are possible and are within the scope of this invention, and would simply require larger branch circuit protection.

Multiple circuits could be staggered:
Two Circuits—AB, AB, AB . . .
Three Circuits—ABC, ABC, ABC . . .
Four Circuits—ABCD, ABCD, ABCD . . .
Five Circuits—ABCDE, ABCDE, ABCDE . . .
Six Circuits—ABCDEF, ABCDEF, ABCDEF . . .
Six Circuits—ABC, ABC, ABC, DEF, DEF, DEF
And so on . . .

There are many ways to stagger the circuits for the outlets, all included within the scope of the invention.

The PDP may be made in any length by mechanically splicing one pipe section to another. A exemplary embodiment of the invention uses four standard lengths to create any length PDP. The four sizes are: 16 inches single outlet, 32 inches double outlet, 48 inches triple outlet, and 96 inches six outlet pipes. The number of 96 inch lengths are maximized in any single PDP connector strip assembly and are run consecutively from the power input end of the PDP with the smaller sections added at the opposite end to adjust for the correct length. An rounded End Cap (6) is installed in the last PDP enclosure (57).

Figure 13:
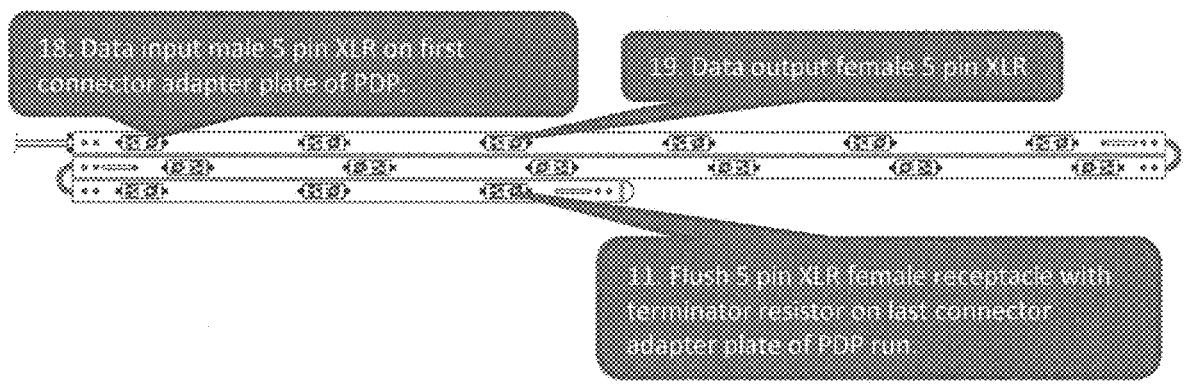
FIG. 13 shows the exemplary connector pipe a partially disassembled condition.

As seen in FIG. 13, the wires run continuously without splices through the entire length of the of the PDP unit from the feed end to the last receptacle on the power or data circuit. The elimination of wire splices reduces the chances of field wiring errors and also speeds installation.

The mechanical splice is made between PDP enclosure (57) sections with an sliding internal splice sleeve (5) secured at both sides of the splice joint with cup point set screws through threaded holes in the PDP wall. The exemplary embodiment uses two cup point set screws on both sides of the splice joint that are in line with the connectors running down the length of the PDP. The sliding internal splice sleeve (5) is secured by the cup point set screws that lock into it at the bottom of the PDP. The PDP enclosure (57) is under compression at the top of the PDP opposite the set screws. The sliding internal splice sleeve (5) has a substantial wall thickness so as not to crush under the pressure of the set screws, or bend with the lateral or axial forces applied to the entire PDP assembly. The sliding internal splice sleeve (5) is inserted a minimum of two inside diameters into the next PDP. The sliding internal splice sleeve (5) has four close fitting radial sockets for the set screws to provide greater resistance to pull out in an axial direction.

Figure 9:
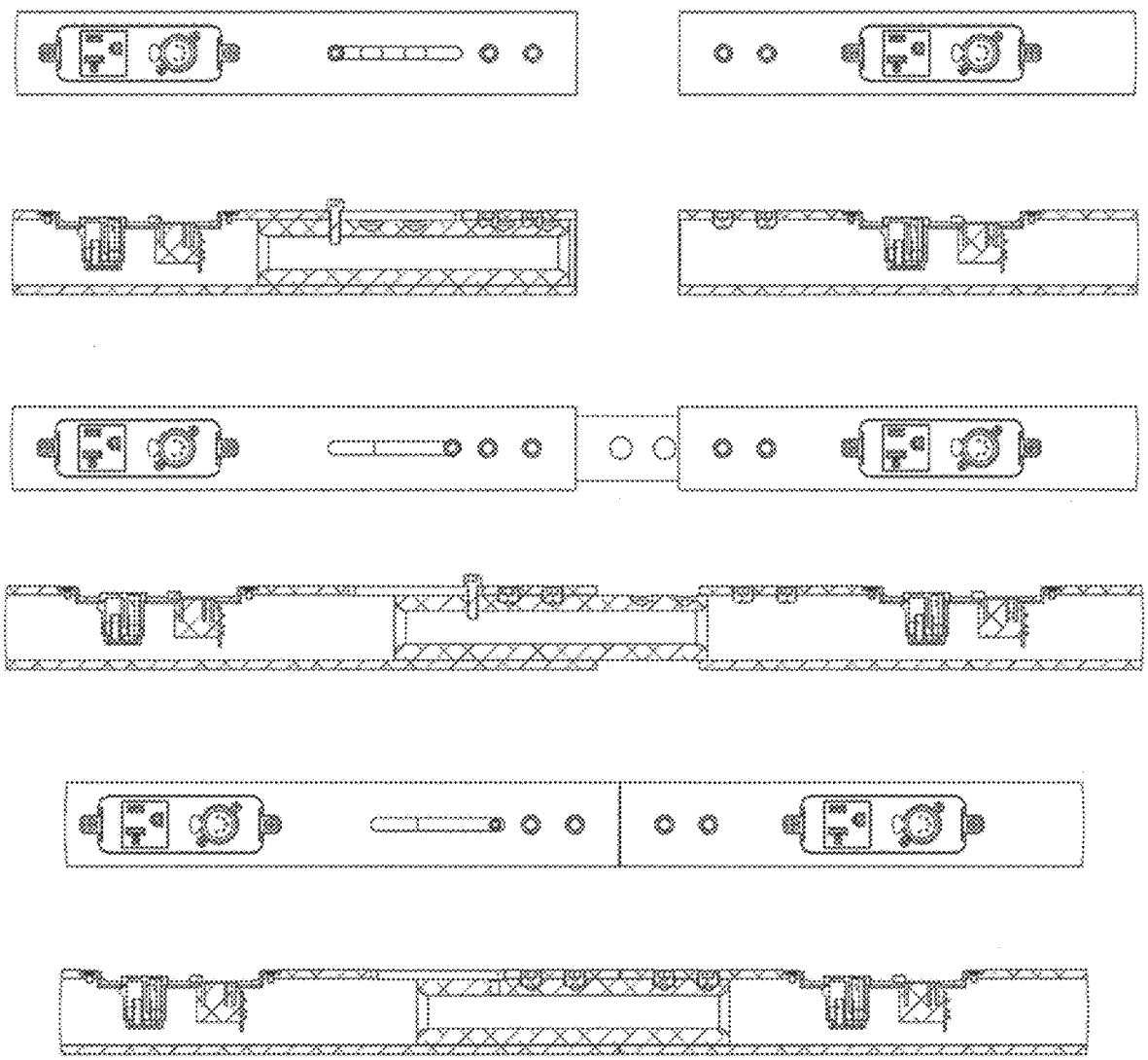
FIGS. 9, 9A, 9B and 9C demonstrate assembly of adjacent sections of the exemplary connector pipe.

FIG. 9 shows a bottom view and cross section of the splice in different stages of installation. The top pair of drawings shows the splice in its retracted shipping location with the socket cap screw protruding above the cross section ready to be used to move the splice out and into the next PDP enclosure (57). The middle pair of drawings show the splice fully extended. Note that the splice is inserted into the next PDP enclosure (57) section during the extension of the splice. At this point the first set screw pair closest to the milled slot (41) would be locked permanently into position. The bottom drawing shows the slice in it's fully installed position with both of the socket set screw pairs fully tightened and the socket cap screw installation aid removed. The wiring is not show for clarity, but would extend from one section of the PDP enclosure (57) to the next through the internal splice sleeve's interior opening.

Figure 9A:
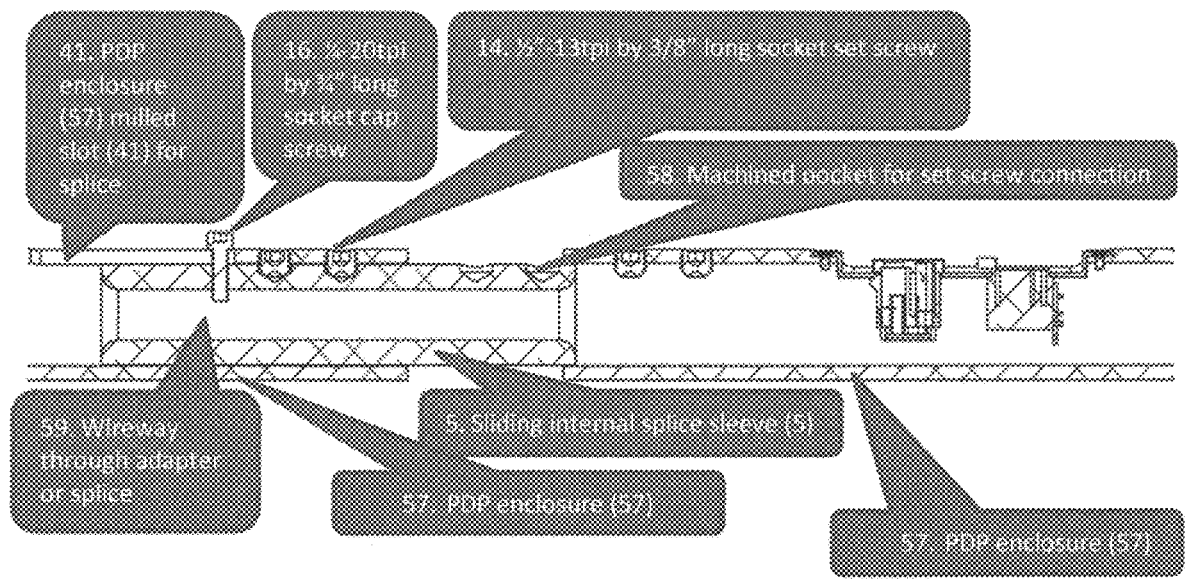

Referring to FIG. 9A, the PDP enclosure (57) wall is threaded for the cup point set screws. The PDP enclosure (57) wall must be substantial enough to provide the required amount of thread engagement for the set screws to perform their function of locking the two PDP sections together. Schedule 80 pipe is used for its thicker wall section in the exemplary embodiment of this invention.

The opposite end from the feed of each PDP enclosure (57) has a milled slot (41) in the pipe wall for a temporary external fastener to engage the sliding internal splice sleeve (5) for installation. The sliding internal splice sleeve (5) is threaded for the temporary external socket head fastener (16). The external socket head fastener (16) is pushed along the milled slot (41) in the wall of the PDP enclosure (57) to slide the sliding internal splice sleeve (5) into the next section of the PDP enclosure (57) preparatory to joining the two PDP enclosure (57) sections together by securing the socket set screws (14) on both sides of the PDP splice joint. The milled slot (41) is on the feed side of the splice joint in line with the two ½"-13 tpi threaded holes (40) for the socket set screws (14). The milled slot (41)'s minimum length is the amount of travel necessary for two inside diameters of the PDP's enclosure section's sliding internal splice sleeve (5) engagement.

Figure 9B:
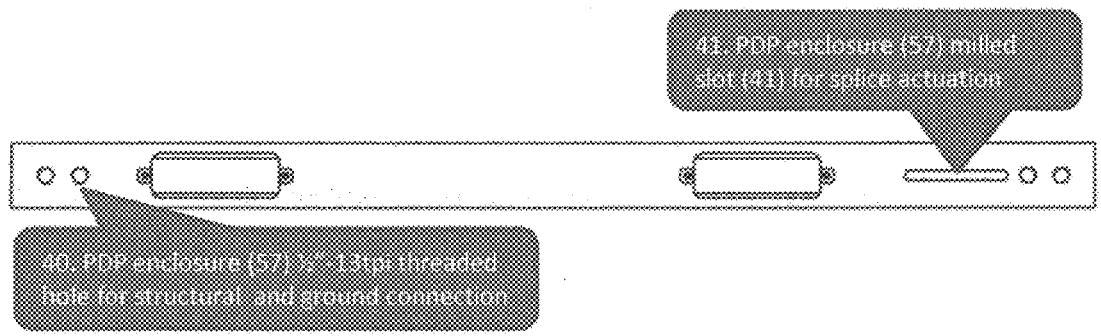

The PDP enclosures (57) are designed to be manufactured on a 3 axis CNC mill. All machining is accomplished in one operation along the length of the PDP enclosure (57) without the need of turning the enclosure. All features are machined in one setup in a CNC mill with sufficient travels. All drilling and tapping are on the PDP enclosure (57)'s axial centerline. All of the PDP's enclosure milling is centered and symmetrical to the axial centerline as seen in FIG. 9B.

The sliding internal splice sleeve (5) is installed inside the PDP flush to the end of each of the enclosure sections, except for the last enclosure section, before the factory wiring is installed. All of the wiring going to the next PDP section passes through the sliding internal splice sleeve (5). Just enough additional wiring between PDP sections is included to be able to fold the PDP sections for shipping. The wires create a hinge for the fold.

During installation, the feed end of the PDP is typically assembled on the ground first. The PDP is unfolded to its full-length end to end. While the PDP is in this position and in careful axial alignment, the external socket head fastener that is secured to the sliding internal splice sleeve (5) is pushed or pulled to extend the sliding internal splice sleeve (5) outward from the feed PDP pipe body to its maximum extended position. During this extension, the sliding internal splice sleeve (5) will be guided into the next PDP section. While the sliding internal splice sleeve (5) is held at full extension, the two ½"-13×⅜" socket set screws (14) that are located in the same section of PDP adjacent to the milled slot (41) are tightened securely to the sliding internal splice sleeve (5). The next section of PDP is then pulled back toward the feed end of the PDP until the two sections of the PDP are flush to each other. The next section of PDP is then secured to the sliding internal splice sleeve (5) by fastening the socket set screws (14) through the PDP wall and against the sliding internal splice sleeve (5). At this point the first two sections of the PDP enclosure (57) are securely fastened to each other. This process is repeated until all of the PDP sections are joined together by the sliding internal splice sleeve (5)s. After each section of the PDP's enclosure is securely fastened together, the temporary external socket head cap screw fastener used to slide the sliding internal splice sleeve (5) would typically be removed and discarded.

Figure 9C:
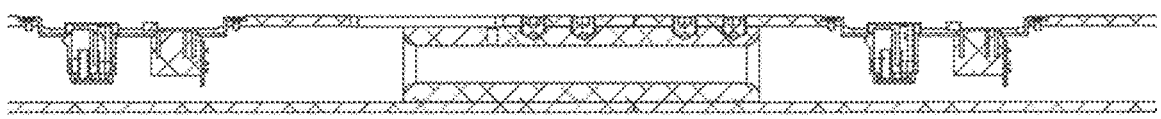
Figure 14:
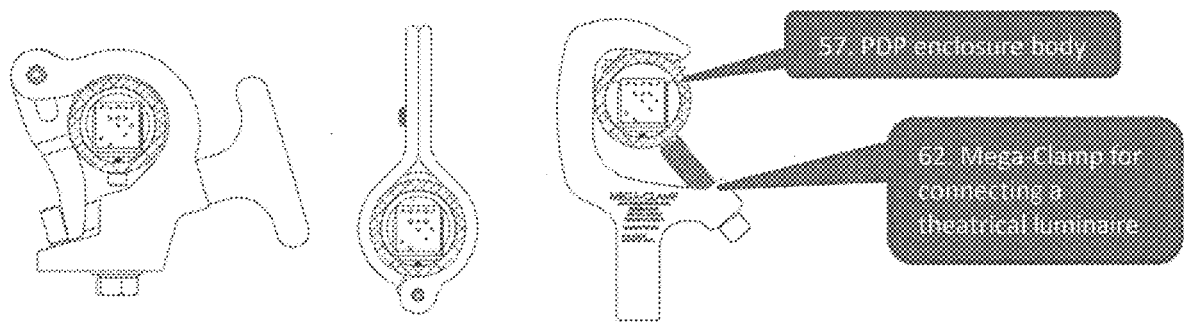
FIG. 14 illustrates an exemplary clamp adapted for use on the present connector pipe.

The finished PDP splice joint is the same outside diameter as the PDP, as all of the splice is internal. This is advantageous as it allows lighting clamps (62) as seen in FIG. 14, or other objects to slide across the splice joint without having to lift them over an external coupling of larger diameter. FIG. 9C shows the PDP enclosure (57) rotated so that the outlets are on the top, normally the outlets would be on the bottom. There is no restriction to the rotation of the PDP section, but to minimize the ingress of dirt and dust the orientation of the outlets on the bottom of the PDP would be the normal installation position.

The wiring is protected in the internal splice transition by the internal pipe splice's large internal radiuses. Both ends of the sliding internal splice sleeve (5) are radiused from the end faces inward towards the inside diameter to keep from nicking the wire insulation. The wiring runs right through the interior (59) of the splice. The sliding internal splice sleeve (5) is flush with the end of the PDP when it is in its full retracted assembly and shipping position, the temporary fastener being as far from the spice joint end of the PDP as allowed by the milled slot (41). The internal radiusing of the splice sleeve provides a smooth edge for the wiring during shipping and installation of the PDP. The feed end of the next section of PDP will have the minimum amount of wire exposed for shipping, may have a bushing or packing sleeve around the wires to protect them, and is folded back alongside of the previous PDP. The feed end of the next section of the PDP would have the internal and external edges deburred so as to not damage the wire insulation during shipping and installation.

Figure 15:
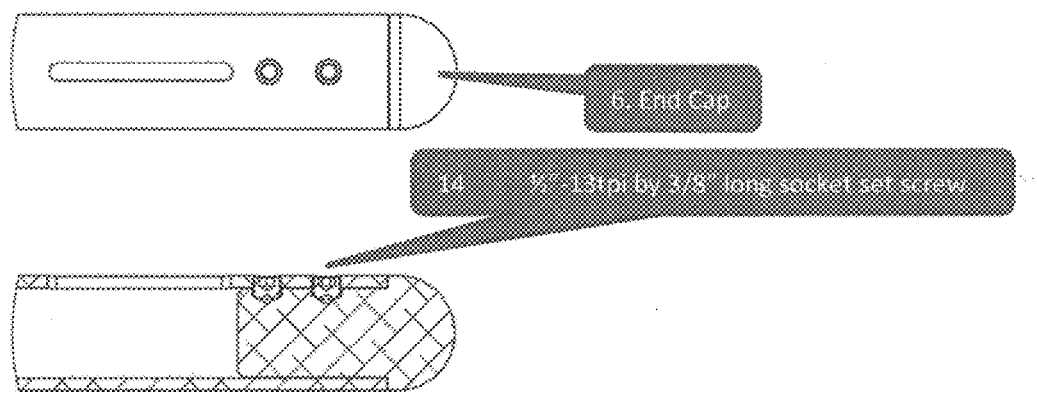
FIG. 15 is a view showing a closed end of the exemplary connector pipe.

As seen in the bottom view and cross section of FIG. 15, an End Cap (6) the full diameter of the PDP, with no exposed sharp edges is secured to the terminating end of the PDP opposite the feed end to complete the enclosure and to prevent injury to users from the relatively hard and sharp end of the PDP. The End Cap (6) has a reduced section to fit inside the PDP so that the two ½"-13 tpi×⅜" long set screws engage to lock the End Cap (6) in place.

The individual PDP sections can be made in any practical length from approximately 16 inches to 20 feet as continuous lengths without splicing. Longer lengths are possible, but would create shipping and installation difficulties making them impractical. Additionally, the present PDP can be radiused (or bent or angled) while maintaining proper and effective functionality to accommodate multiple applications and environments.

The PDP may be mounted to the building structure with many standard theatrical rigging methods. The exemplary embodiment utilizes The Light Source, Inc.'s Mega-Folding Batten Clamp and/or Mega-Gridlock to support the PDP connector strips. The Mega-Folding Batten Clamp, the Mega-Gridlock, the PDP's feed connection, internal spice sleeve, and End Cap (6) all use the same ¼" hex key tool for installation. This greatly simplifies installation and saves time. Both the Folding Batten Clamp and the Mega-Gridlock securely grip the PDP enclosure (57) and prevent rotation of the PDP's enclosure during usage.

Other support connections may be used and be consistent with embodiments of the invention.

Figure 16:
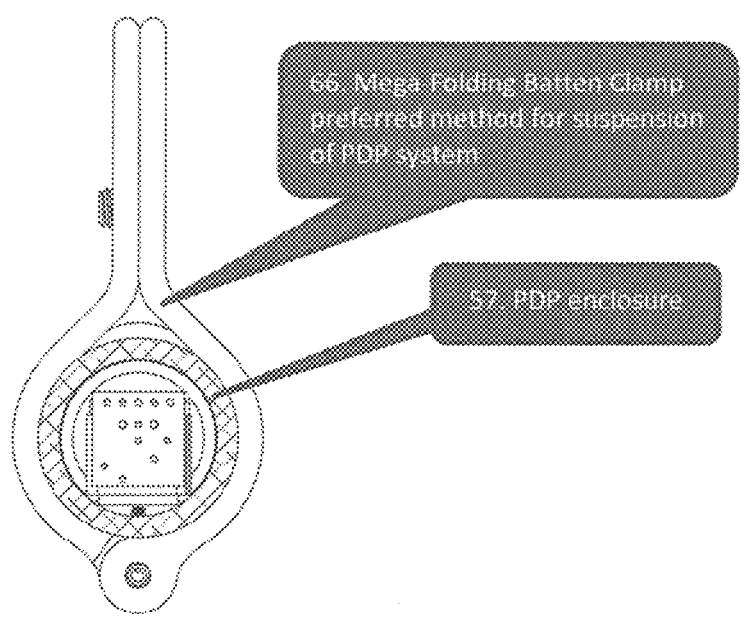
FIG. 16 illustrates a further exemplary clamp adapted for use on the present connector pipe.

The Light Source, Inc.'s Mega-Folding Batten Clamp (66) is shown in FIG. 16 wrapped around the PDP enclosure (57). The threaded fastener shown protruding from the Mega-Folding Batten Clamp is a flat head socket screw that utilizes the same wrench to install as the set screws used to secure the PDP enclosure (57) sections together. This minimizes the tooling required to install the PDP system.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under 35 U.S.C. § 112(f) [or 6th paragraph/pre-AIA] is not intended. Additionally, it is not intended that the scope of patent protection afforded the present invention be defined by reading into any claim a limitation found herein that does not explicitly appear in the claim itself.

What is claimed:

1. An electrical connector strip adapted for structural applications in theater, television and entertainment industries, said connector strip comprising:
    an elongated rigid enclosure defining a hollow continuous internal wireway receiving electrical wiring within an interior of said enclosure;
    at least one outlet pocket formed in a side wall of said enclosure;
    a connector adapter plate located in said outlet pocket, and extending within the interior of said enclosure;
    at least one output connector carried by said connector adapter plate, and residing within the interior of said enclosure with external access through said outlet pocket, and wherein said connector adapter plate further comprises a plate body defining a cutout receiving said output connector and locating said output connector within the interior of said enclosure.

2. The electrical connector strip according to claim 1, wherein no portion of said output connector extends through said outlet pocket beyond an exterior of said enclosure.

3. The electrical connector strip according to claim 1, wherein said at least one output connector comprises a female power receptacle.

4. The electrical connector strip according to claim 1, wherein said at least one output connector comprises a multi-pin XLR data connector.

5. The electrical connector strip according to claim 1, wherein said at least one output connector comprises a female power receptacle and a data connector.

6. The electrical connector strip according to claim 1, and comprising a power feed adapter located at a feed end of said enclosure.

7. The electrical connector strip according to claim 1, and comprising an internal splice sleeve located within said enclosure and adapted for mechanically interconnecting said electrical connector strip to a second electrical connector strip.

8. The electrical connector strip according to claim 1, and comprising an end cap located at a terminal end of said enclosure.

9. The electrical connector strip according to claim 1, and comprising an electrical feed box located at a feed end of said enclosure.

10. The electrical connector strip according to claim 9, and comprising a feed box adapter sleeve operatively interconnecting said electrical feed box and the feed end of said enclosure.

11. The electrical connector strip according to claim 1, wherein said enclosure comprises a plurality of outlet pockets formed in the side wall of said enclosure, a corresponding plurality of connector adapter plates located in said outlet pockets, and a plurality of output connectors carried by said connector adapter plates within the interior of said enclosure.

12. The electrical connector strip according to claim 1, wherein said enclosure comprises a single-wall homogenous tubular structure integrally formed between opposite ends of said enclosure.

13. The electrical connector strip according to claim 1, wherein said enclosure is fabricated of a metal selected from a group consisting of steel and aluminum.

\* \* \* \* \*